(12) United States Patent
Takahashi et al.

(10) Patent No.: US 7,870,423 B2
(45) Date of Patent: *Jan. 11, 2011

(54) DATA PROCESSING SYSTEM AND COPY PROCESSING METHOD THEREOF

(75) Inventors: Masamitsu Takahashi, Chigasaki (JP); Koji Ozawa, Ninomiya (JP); Takao Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 12/055,096

(22) Filed: Mar. 25, 2008

(65) Prior Publication Data

US 2008/0178041 A1    Jul. 24, 2008

Related U.S. Application Data

(63) Continuation of application No. 10/970,028, filed on Oct. 22, 2004, now Pat. No. 7,370,228.

(30) Foreign Application Priority Data

Sep. 1, 2004   (JP) ............................ 2004-254521

(51) Int. Cl.
*G06F 11/00* (2006.01)
(52) U.S. Cl. .......................................... 714/6; 707/655
(58) Field of Classification Search ................. 707/655, 707/656, 658
See application file for complete search history.

(56) References Cited

U.S. PATENT DOCUMENTS

| | | |
|---|---|---|
| 6,209,002 B1 | 3/2001 | Gagne et al. |
| 6,529,944 B1 | 3/2003 | LeCrone |
| 6,643,795 B1 | 11/2003 | Sicola et al. |
| 6,662,197 B1 | 12/2003 | LeCrone et al. |
| 7,055,059 B2 | 5/2006 | Yanai et al. |

(Continued)

FOREIGN PATENT DOCUMENTS

EP    1283469    2/2003

(Continued)

OTHER PUBLICATIONS

EMC Corporation: "SRDF/Asynchronous: A Technical Description," EMC White Paper, Online! No. C1058.4, Oct. 9, 2003, pp. 1-12, XP002365579, retrieved on Jan. 30, 2006.

*Primary Examiner*—Gabriel L Chu
(74) *Attorney, Agent, or Firm*—Antonelli, Terry, Stout & Kraus, LLP.

(57) ABSTRACT

The invention is a copy processing technique in a data processing system, which can simultaneously achieve long-distance communication and no data loss when disaster occurs. Among a production site, a local site, and a remote site, long-distance remote copying from a disk array device at the production site to a disk array device at the remote site without data loss is achieved via a disk array device at the local site in combination with synchronous remote copying and asynchronous remote copying. Also, in the disk array devices at the local site and the remote site, copying is performed through a replica function. Even if the production site is affected by disaster, tasks can be continued at the local site having the same data as that of the production site and at the remote site a long distance away from the production site.

12 Claims, 29 Drawing Sheets

U.S. PATENT DOCUMENTS

| | | |
|---|---|---|
| 7,165,141 B2 | 1/2007 | Cochran et al. |
| 7,188,272 B2 | 3/2007 | Bartfai et al. |
| 7,334,101 B2 * | 2/2008 | Yagawa et al. .............. 711/162 |
| 2001/0007102 A1 | 7/2001 | Gagne et al. |
| 2001/0010070 A1 * | 7/2001 | Crockett et al. ............. 711/162 |
| 2001/0050915 A1 | 12/2001 | O'Hare et al. |
| 2004/0024975 A1 | 2/2004 | Morishita et al. |
| 2004/0034808 A1 | 2/2004 | Day et al. |

FOREIGN PATENT DOCUMENTS

| | | |
|---|---|---|
| JP | 2002-542526 | 12/2002 |

* cited by examiner

FIG. 5

| Initial State | Synchronous Remote Copying ①→② | Replica Function of ②→③ | Asynchronous Remote Copying of ③→④ | Replica Function of ④→⑤ |
|---|---|---|---|---|
| ① | Simplex | Simplex | Simplex | Simplex |
| Pair Establishing Instruction of ①→② | Simplex → Duplex Pending → Duplex | Simplex | Simplex | Simplex |
| Pair Establishing Instruction of ②→③ | Duplex | Simplex → Duplex Pending → Duplex | Simplex | Simplex |
| Suspend Instruction of ②→③ | Duplex | Duplex → Splitting → Split | Simplex | Simplex |
| Pair Establishing Instruction of ③→④ | Duplex | Split | Simplex → Duplex Pending → Duplex | Simplex |
| Suspend Instruction of ③→④ | Duplex | Split | Duplex → Suspending → Suspend | Simplex |
| Resync Instruction of ②→③ Pair Establishing Instruction of ④→⑤ | Duplex | Split → Duplex Pending(Resyncing) → Duplex | Suspend | Simplex → Duplex Pending → Duplex |

FIG. 6

| | Synchronous Remote Copying ①→② | Replica Function of ②→③ | Asynchronous Remote Copying of ③→④ | Replica Function of ④→⑤ |
|---|---|---|---|---|
| Initial State | Duplex | Duplex | Suspend | Duplex |
| Split Instruction of ④→⑤ | Duplex | Duplex | Suspend | Duplex → Splitting → Split |
| Split Instruction of ②→③ | Duplex | Duplex → Splitting → Split | Suspend | Split |
| Resync Instruction of ③→④ | Duplex | Split | Suspend → Duplex Pending(Resyncing) → Duplex | Split |
| Suspend Instruction of ③→④ | Duplex | Split | Duplex → Suspending → Suspend | Split |
| Resync Instruction of ④→⑤ | Duplex | Split | Suspend | Split → Duplex Pending(Resyncing) → Duplex |
| Resync Instruction of ②→③ | Duplex | Split → Duplex Pending(Resyncing) → Duplex | Suspend | Split |

FIG. 7

| | Synchronous Remote Copying ①→② | Replica Function of ②→③ | Asynchronous Remote Copying of ③→④ | Replica Function of ④→⑤ |
|---|---|---|---|---|
| Initial State | Duplex | Duplex | Suspend | Duplex |
| Split Instruction of ④→⑤ | Duplex | Duplex | Suspend | Duplex → Splitting → Split |
| Split Instruction of ②→③ | Duplex | Duplex → Splitting → Split | Suspend | Split |
| Resync Instruction of ③→④ | Duplex | Split | Suspend → Duplex Pending(Resyncing) → Duplex | Split |
| Suspend Instruction of ③→④ | Duplex | Split | Duplex → Suspending → Suspend | Split |
| Resync Instruction of ④→⑤<br>Resync Instruction of ②→③ | Duplex | Split → Duplex Pending(Resyncing) → Duplex | Suspend | Split → Duplex Pending(Resyncing) → Duplex |

FIG. 8

| | Synchronous Remote Copying ①→② | Replica Function of ②→③ | Asynchronous Remote Copying of ③→④ | Replica Function of ④→⑤ |
|---|---|---|---|---|
| Initial State | Duplex | Duplex | Suspend | Duplex |
| Split Instruction of ②→③<br>Split Instruction of ④→⑤ | Duplex | Duplex → Splitting → Split | Suspend | Duplex → Splitting → Split |
| Resync Instruction of ③→④ | Duplex | Split | Suspend → Duplex Pending(Resyncing) → Duplex | Split |
| Suspend Instruction of ③→④ | Duplex | Split | Duplex → Suspending → Suspend | Split |
| Resync Instruction of ④→⑤<br>Resync Instruction of ②→③ | Duplex | Split → Duplex Pending(Resyncing) → Duplex | Suspend | Split → Duplex Pending(Resyncing) → Duplex |

FIG. 10

| State | Synchronous Remote Copying ①→② | Replica Function of ②→③ | Asynchronous Remote Copying of ③→④ | Replica Function of ④→⑤ | Pair Operating Process |
|---|---|---|---|---|---|
| Start Recovery | ? | Duplex | Suspend | Split | — |
| A | ? | Split | Suspend | Split | Resync Replica Function of ②→③ |
| C | ? | Split | Duplex | Split | Suspend Asynchronous Remote Copying of ③→④ Resync Replica Function of ②→③ |
| E | ? | Split | Suspend | Split | Resync Replica Function of ②→③ |
| L | ? | Duplex | Suspend | Duplex | Split Replica Function of ④→⑤ |
| N | ? | Duplex | Suspend | Split | Pair Operation not required |
| T | ? | Split | Suspend | Duplex | Resync Replica Function of ②→③ Split Replica Function of ④→⑤ |
| V | ? | Split | Suspend | Split | Resync Replica Function of ②→③ |

FIG. 11

| | Synchronous Remote Copying ①→② | Replica Function of ②→③ | Asynchronous Remote Copying of ③→④ | Replica Function of ④→⑤ |
|---|---|---|---|---|
| Initial State | ? | Duplex | Suspend | Split |
| Split Instruction of ②→③ | ? | Duplex → Splitting → Split | Suspend | Split |
| Resync Instruction of ③→④ | ? | Split | Suspend → Duplex Pending(Resyncing) → Duplex | Split |

FIG. 14

| | Synchronous Remote Copying ①→② | Replica Function of ②→③ | Asynchronous Remote Copying of ③→④ | Replica Function of ④→⑤ |
|---|---|---|---|---|
| Data-Transfer-Completed State | ? | | Duplex | Split |
| Delete Instruction of ①→② | ? → Deleting → Simplex | Split | Duplex | Split |
| Delete Instruction of ②→③ | Simplex | Split → Deleting → Simplex | Duplex | Split |
| Suspend (Reverse Mode) Instruction of ③→④ | Simplex | Simplex | Duplex → Suspending → Suspend | Split |
| Resync (Reverse Mode) Instruction of ③→④ | Simplex | Simplex | Suspend → Resyncing → Duplex | Split |
| Pair Establishing Instruction of ③→② | Simplex | Simplex → Duplex Pending → Duplex | Duplex | Split |

FIG. 15

| | Asynchronous Remote Copying of ③→④ | Replica Function of ④→⑤ |
|---|---|---|
| Failure Occurring State | Suspend | Split /Resyncing /Duplex /Splitting |
| Delete Instruction of ④→⑤ | Suspend | Split /Resyncing /Duplex /Splitting ↓ Deleting ↓ Simplex |
| Suspend (Reverse Mode) Instruction of ③→④ | Suspend ↓ Suspending ↓ Suspend | Simplex |

FIG. 16
| | Asynchronous Remote Copying of ③→④ | Replica Function of ④→⑤ |
|---|---|---|
| Failure Occurring State 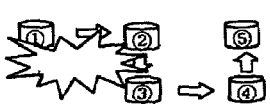 | Suspend (Failed Suspend) | Split |
| High−Speed Resync (Reverse Mode) Instruction of ④→⑤  | Suspend (Failed Suspend) | Split ↓ Resycing ↓ Duplex |
| Delete Instruction of ④→⑤  | Suspend | Duplex ↓ Deleting ↓ Simplex |
| Suspend (Reverse Mode) Instruction of ③→④  | Suspend ↓ Suspending ↓ Suspend | Simplex |

FIG. 19

| | Synchronous Remote Copying ①→② | Replica Function of ②→③ | Asynchronous Remote Copying of ③→④ | Replica Function of ④→⑤ |
|---|---|---|---|---|
| Failover State to Remote Site | ???(Uncertain) | Simplex | Suspend(Reverse) | Simplex/Split |
| Delete Instruction of ③→④ | ???(Uncertain) | Simplex | Suspend(Reverse) → Deleting → Simplex | Simplex/Split |
| Pair Establishing Instruction of ④→③ | ???(Uncertain) | Simplex | Simplex → Duplex Pending → Duplex | Simplex/Split |
| Pair Delete Instruction of ①→② | ???(Uncertain) → Deleting → Simplex | Simplex | Duplex | Simplex/Split |
| Pair Establishing Instruction of ③→② | Simplex | Simplex → Duplex Pending → Duplex | Duplex | Simplex/Split |

FIG. 20

| | Synchronous Remote Copying ①→② | Replica Function of ②→③ | Asynchronous Remote Copying of ③→④ | Replica Function of ④→⑤ |
|---|---|---|---|---|
| Failover State to Remote Site | ???(Uncertain) | ???(Uncertain) | Suspend(Reverse) | Simplex/Split |
| Delete Instruction of ②→③ | ???(Uncertain) | ???(Uncertain) → Deleting → Simplex | Resync(Reverse) | Simplex/Split |
| Resync (Reverse Mode) Instruction of ③→④ | ???(Uncertain) | Simplex | Resync(Reverse) → Resyncing → Duplex | Simplex/Split |
| Pair Delete Instruction of ①→② | ???(Uncertain) → Deleting → Simplex | Simplex | Duplex | Simplex/Split |
| Pair Establishing Instruction of ③→② | Simplex | Simplex → Duplex Pending → Duplex | Duplex | Simplex/Split |

FIG. 21

| | Synchronous Remote Copying ①→② | Replica Function of ②→③ | Asynchronous Remote Copying of ③→④ | Replica Function of ④→⑤ |
|---|---|---|---|---|
| State after Recovery of Local Site | ??? | Duplex | Duplex | Simplex/Split |
| Pair Delete Instruction of ①→② | ???(Uncertain) → Deleting → Simplex | Duplex | Duplex | Simplex/Split |
| Pair Time-Designation Suspend Instruction of ④→③ | Simplex | Duplex | Duplex → Suspending → Suspend | Simplex/Split |
| Pair Split Instruction of ③→② | Simplex | Duplex → Splitting → Split | Suspend | Simplex/Split |
| Pair Resync Instruction of ④→③ | Simplex | Split | Suspend → Resyncing → Duplex | Simplex/Split |
| Pair Establishing Instruction of ②→① | Simplex → Duplex Pending → Duplex | Split | Duplex | Simplex/Split |
| Pair Suspend Instruction of ②→① | Duplex → Suspending → Suspend | Split | Duplex | Simplex/Split |

FIG. 22

| | Synchronous Remote Copying ①→② | Replica Function of ②→③ | Asynchronous Remote Copying of ③→④ | Replica Function of ④→⑤ |
|---|---|---|---|---|
| Pair Secondary Volume Write— Enable Instruction of ②→① | Suspend ↓ Suspend (Secondary Volume Write—Enable) | Split | Duplex | Simplex/Split |
| Perform Production Site Test | Suspend (Secondary Volume Write—Enable) | Split | Duplex | Simplex/Split |
| Pair Resync Instruction of ③→② | Suspend (Secondary Volume Write—Enable) | Split ↓ Resyncing ↓ Duplex | Duplex | Simplex/Split |
| Pair Time—Designation Suspend Instruction of ④→③ | Suspend (Secondary Volume Write—Enable) | Duplex | Duplex ↓ Suspending ↓ Suspend | Simplex/Split |
| Pair Split Instruction of ③→② | Suspend (Secondary Volume Write—Enable) | Duplex ↓ Splitting ↓ Split | Suspend | Simplex/Split |
| Pair Resync Instruction of ④→③ | Suspend (Secondary Volume Write—Enable) | Split | Suspend ↓ Resyncing ↓ Duplex | Simplex/Split |
| Pair Resync Instruction of ②→① | Suspend (Secondary Volume Write—Enable) ↓ Duplex Pending ↓ Duplex | Split | Duplex | Simplex/Split |

Follow FIG.23

FIG. 23

Continued from FIG.22

| | Synchronous Remote Copying ①→② | Replica Function of ②→③ | Asynchronous Remote Copying of ③→④ | Replica Function of ④→⑤ |
|---|---|---|---|---|
| Pair Suspend Instruction of ②→① | Duplex ↓ Suspending ↓ Suspend | Split | Duplex | Simplex/Split |
| Pair Resync Instruction of ③→② | Suspend | Split ↓ Resyncing ↓ Duplex | Duplex | Simplex/Split |

FIG. 24

| | Synchronous Remote Copying ①→② | Replica Function of ②→③ | Asynchronous Remote Copying of ③→④ | Replica Function of ④→⑤ |
|---|---|---|---|---|
| Stop Application at Remote Site | Suspend | Duplex | Duplex | Simplex/Split |
| Pair Suspend & Delete Instruction of ④→③ | Suspend | Duplex | Duplex → Suspend → Simplex | Simplex/Split |
| Pair Split & Delete Instruction of ③→② | Suspend | Duplex → Split → Simplex | Simplex | Simplex/Split |
| Pair Resync Instruction of ②→① | Suspend → Resyncing → Duplex | Simplex | Simplex | Simplex/Split |
| Pair Split & Delete Instruction of ②→① | Duplex → Split → Simplex | Simplex | Simplex | Simplex/Split |
| Pair Establishing Instruction of ②→① | Simplex → Duplex | Simplex | Simplex | Simplex/Split |

Follow FIG.25

FIG. 25

Continued from FIG.24

| | Synchronous Remote Copying ①→② | Replica Function of ②→③ | Asynchronous Remote Copying of ③→④ | Replica Function of ④→⑤ |
|---|---|---|---|---|
| Start Application at Production Site | Duplex | Simplex | Simplex | Simplex/Split |
| Perform Initial Pair Establishing Procedure | Duplex | Simplex | Simplex | Simplex/Split |

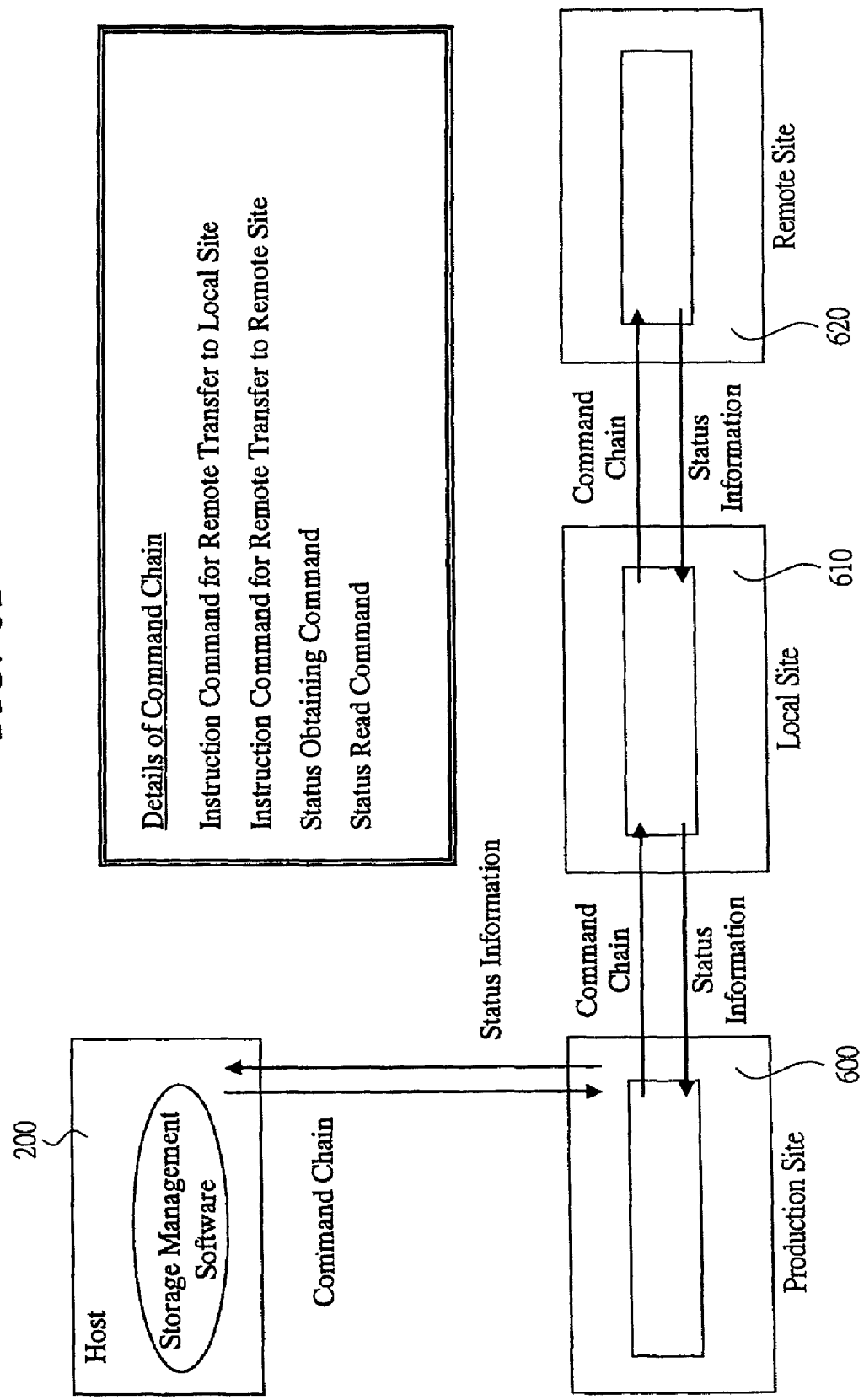

DATA PROCESSING SYSTEM AND COPY PROCESSING METHOD THEREOF

CROSS-REFERENCE TO RELATED APPLICATION

This application is a continuation application of U.S. patent application Ser. No. 10/970,028, filed Oct. 22, 2004, now U.S. Pat. No. 7,370,228 which application claims priority from Japanese patent application No. JP 2004-254521 filed on Sep. 1, 2004, the content of which is hereby incorporated by reference into this application.

BACKGROUND OF THE INVENTION

The present invention relates to a copy processing technique for a data processing system having a plurality of disk array devices and particularly to an effective technique applicable to a process for simultaneously achieving long-distance communication and no data loss at a time of occurrence of disaster.

According to studies conducted by the inventors of the present invention, the following techniques are available to a conventional copy processing technique for the data processing system.

For example, in recent years, in order to always provide continuous services to a client, the data copying technique among a plurality of disk array devices have been suggested so that the services can be provided even when failure occurs in the disk array device such as a storage device for storing data. Particularly important is a technique for continuing and restarting data copying among remote sites and data copying at the time of failure. An example of a technique used in a data processing system having a plurality of disk array devices for copying, to second and third disk array devices, information stored in a first disk array device is disclosed in Patent Document 1 (U.S. Pat. No. 6,209,002).

In the Patent Document 1, a disk array device is provided to each of a local/production site, a first remote site, and a second remote site. Among these three disk array devices, the disk array device at the local/production site transfers data stored therein to the disk array device at the first remote site for copying. Then, the disk array device at the first remote site stores the transferred data and also transfers the data to the disk array device at the second remote site. Then, the disk array device at the second remote site stores the transferred data. Thereby, the technique for making the data redundant is disclosed.

SUMMARY OF THE INVENTION

However, the followings have become apparent from results obtained through the conventional copy processing techniques in the data processing system studied above by the inventors.

For example, the above Patent Document 1 particularly focuses on an operation processing of the disk array device at the first remote site among the local/production site, the first remote site, and the second remote site. Also, it relates to only one-directional data transfer from the disk array device at the local/production site to the disk array device at the first remote site and then from the disk array device at the first remote site to the disk array device at the second remote site. However, it does not consider bidirectional data transfer.

Also, in the conventional copy processing technique for the data processing system, it is impossible to simultaneously achieve long-distance communication and no data loss at a time of occurrence of disaster. That is, in synchronous remote copying between two sites, no data loss occurs due to a synchronous process. However, if the distance therebetween is long, its process becomes delayed. Moreover, in asynchronous remote copying between the two sites, the distance therebetween can be elongated. However, data in process may be lost.

Therefore, an object of the present invention is to provide a copy processing technique for a data processing system, which is capable of simultaneously achieving long-distance communication and no data loss at a time of occurrence of disaster.

The above and other objects and novel features of the present invention will become apparent from the description of this specification and the accompanying drawings.

Outlines of representative ones of inventions disclosed in the present application will be briefly described as follows.

The present invention has a data processing system comprising a plurality of disk array devices each including a storage device in which a plurality of logical volumes for storing data are set and a controlling unit for controlling storage of data into the logical volumes set in the storage device, and is applied to a data processing system and a copy processing method thereof, wherein the plurality of disk array devices include at least a first disk array device, a second disk array device, and a third disk array device, the first disk array device being disposed at a first site, the second disk array device being disposed at a second site, and the third disk array device being disposed at a third site, the first disk array device has a first logical volume, the second disk array device has a second logical volume and a third logical volume, and the third disk array device has a fourth logical volume and a fifth logical volume, bidirectional data transfer is possible among the first disk array device, the second disk array device, and the third disk array device. Therefore, the present invention has the following characteristics.

That is, in the present invention, a controlling unit of the first disk array device has a function of, upon reception of a command having a remote command function issued from an upper apparatus connected to the first disk array device, analyzing the command, transferring the command to the second disk array device when an instruction command for remote transfer to the second disk array device is added, and to perform a process within the first disk array device when it is not added; a controlling unit of the second disk array device has a function of, upon receipt of the command having the remote command function transferred from the first disk array device, analyzing the command to transfer the command to the third disk array device when an instruction command for remote transfer to the third disk array device is added, and to perform a process within the second disk array device when it is not added; and a controlling unit of the third disk array device has a function of, upon receipt of the command having the remote command function transferred from the second disk array device, performing a process within the third disk array device.

In particularly, the command having the remote command function issued from an upper apparatus includes: a first control command to the first disk array device for synchronous remote copying; a second control command to the second disk array device for asynchronous remote copying; a third control command to the second disk array device for a replica function; and a fourth control command to the third disk array device for the replica function. Further, the first disk array device includes a logical volume for a command device issuing the first control command; the second disk array device includes a logical volume for a command device issuing the second control command and the third control command; and the third disk array device includes a logical volume for a command device issuing the fourth control command.

In addition, data transfer from the second disk array device to the third disk array device is performed by repeating: (a) a Split state having a replica function between the second logical volume and the third logical volume; (b) a Resync & Suspend state having asynchronous remote copying between the third logical volume and the fourth logical volume; (c) a Resync state having a replica function between the second logical volume and the third logical volume; and (d) a Resync & Suspend state having a replica function between the fourth logical volume and the fifth logical volume.

Also, when a function of the first disk array device is stopped due to occasion of disaster, data of the second logical volume is transferred to the third disk array device by performing (a) a Split state having a replica function between the second logical volume and the third logical volume and (b) a Resync & Suspend state having asynchronous remote copying between the third logical volume and the fourth logical volume, and resumes tasks at the third disk array device. Further, at a time of recovery after a function of the first disk array device is stopped, data recovery from the second disk array device to the first disk array device is performed.

Or, when functions of the first disk array device and the second disk array device are stopped due to occurrence of disaster, data of the fourth logical volume or the fifth logical volume is used to resume tasks at the third disk array device. Further, at a time of recovery after functions of the first disk array device and the second disk array device are stopped due to occasion of disaster, data recovery from the third disk array device to the second disk array device is performed and then data recovery from the second disk array device to the first disk array device is performed.

Also, when data consistency is ensured in setting a replica function between the second logical volume and the third logical volume to be in a Split state, a write operation in the first logical volume, which establishes a pair with synchronous remote copying of the second logical volume, is temporarily stopped and, during a stopped state, a pair operation of a replica function between the second logical volume and the third logical volume is set to be in a Split state. When the write operation to the first logical volume is temporarily stopped, a Freeze command is issued to all of the disk array devices in which a pair forming a group of synchronous remote copying along with the first logical volume exists, and a state of Freeze is released by issuing a Run command.

Effects of representative ones of inventions disclosed in the present application will be briefly described as follows.

According to the present invention, in a data processing system having a plurality of disk array devices, data is transferred in combination with remote copying and a replica function, thereby simultaneously achieving long-distance communication and no data loss at a time of occasion of disaster.

BRIEF DESCRIPTION OF THE DRAWINGS

FIG. 5 is a diagram showing a pair-state establishing procedure in an initial copy establishing procedure in the embodiment of the present invention.

FIG. 6 is a diagram showing a procedure of sequentially causing a state change of each pair in a copying procedure at a time of a normal operation in the embodiment of the present invention.

FIG. 7 is a diagram showing a procedure of simultaneously controlling a replica function between volumes 2 and 3 and a replica function between volumes 4 and 5 in the embodiment of the present invention.

FIG. 8 is a diagram showing a procedure of simultaneously controlling a process of issuing a Split instruction and a process of issuing a Resync instruction of a replica function between volumes 2 and 3 and a replica function between volumes 4 and 5.

FIG. 10 is a diagram showing a pair operating process in a state of starting data transfer in the embodiment of the present invention.

FIG. 11 is a diagram showing a recovering procedure at a time of stopping a production site function in the embodiment of the present invention.

FIG. 14 is a diagram showing a preparing procedure for starting an application in the embodiment of the present invention.

FIG. 15 is a diagram showing procedures for patterns 1 to 4 in the embodiment of the present invention.

FIG. 16 is a diagram showing a procedure for pattern 5 in the embodiment of the present invention.

FIG. 19 is a diagram showing a local-site recovering procedure (when an appliance at the local site cannot be reused) in the embodiment of the present invention.

FIG. 20 is a diagram showing another local-site recovering procedure (when an appliance at the local site cannot be reused) in the embodiment of the present invention.

FIG. 21 is a diagram showing a production-site recovering procedure in the embodiment of the present invention.

FIG. 22 is a diagram showing a production-site testing procedure in the embodiment of the present invention.

FIG. 23 is a diagram showing a production-site testing procedure continued from FIG. 22 in the embodiment of the present invention.

FIG. 24 is a diagram showing task changing to the production site in the embodiment of the present invention.

FIG. 25 is a diagram showing task changing to the production site continued from FIG. 24 in the embodiment of the present invention.

FIG. 31 is a diagram showing execution of the remote site in the command chain in the embodiment of the present invention.

DESCRIPTION OF THE PREFERRED EMBODIMENT

Hereinafter, an embodiment of the present invention will be detailed based on the drawings. Note that members having the same function are denoted by the same numeral in principle throughout all the drawings for describing the embodiment and the repetitive explanation thereof will be not omitted.

<Entire Configuration of Data Processing System>

Figure 1:
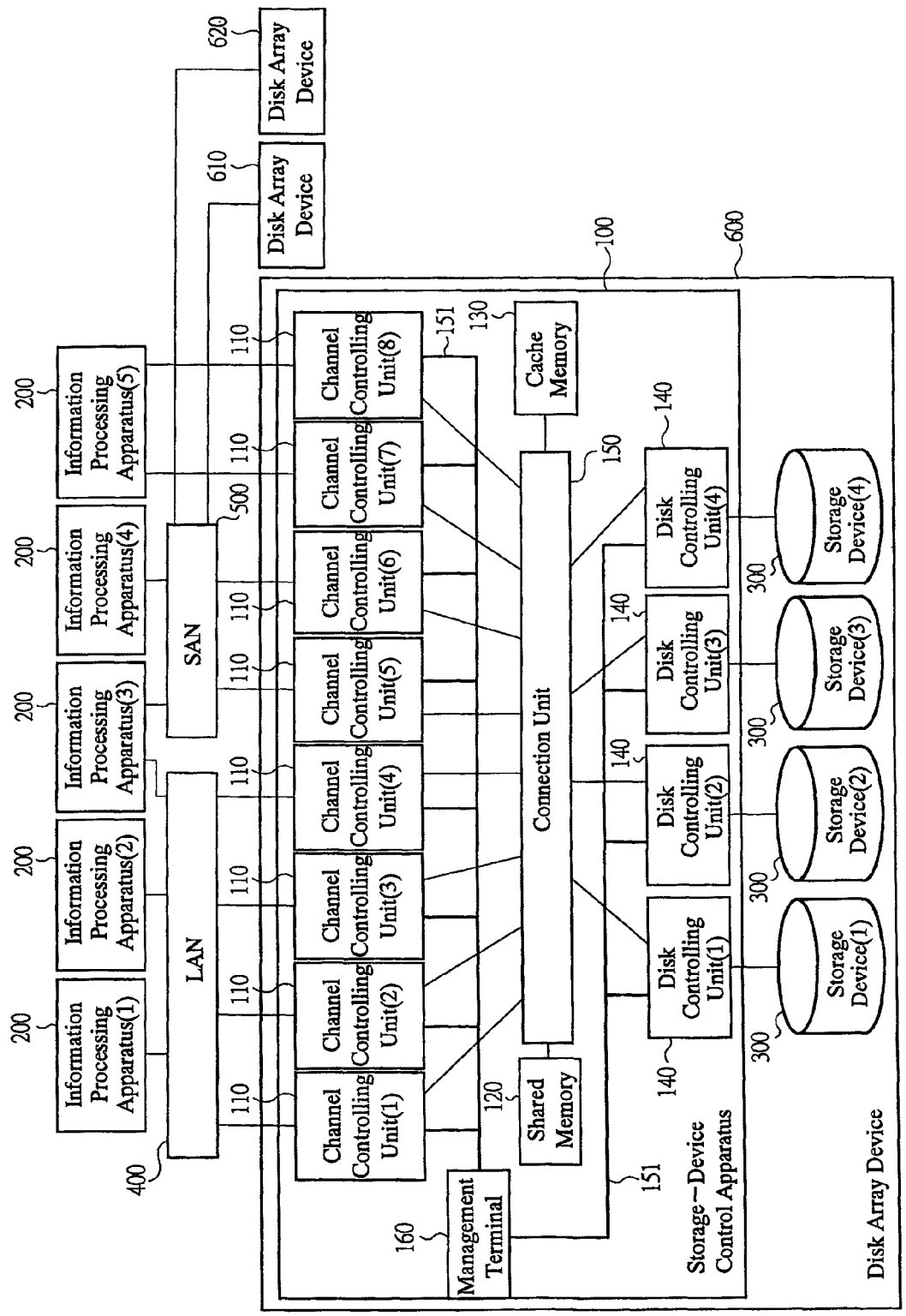
FIG. 1 is a block diagram showing the entire configuration of a data processing system according to an embodiment of the present invention.

With reference to FIG. 1, an example of the entire configuration of a data processing system according to an embodiment of the present invention will be described. FIG. 1 is a block diagram showing the entire configuration of the data processing system.

In a data processing system according to the present embodiment, a disk array device 600 includes a storage-device control apparatus 100 and storage devices 300. The storage-device control apparatus 100 controls the storage devices 300 in accordance with commands received from the information processing apparatuses 200. For example, the storage-device control apparatus 100 receives a data input/output request from one of the information processing apparatuses 200, and then performs a process for input/output of data stored in the storage devices 300. Data is stored in a logical volume (Logical Unit, hereinafter also referred to as "LU"), which is a storage area logically set on a physical storage area provided by a disk drive included in each storage device 300. Also, the storage-device control apparatus 100 receives from and transmits to the information processing apparatuses 200 various commands for managing the disk array device 600. Each information processing apparatus 200 is implemented by a computer including a CPU (Central Processing Unit) or a memory. Since different programs are executed by the CPU included in the information processing apparatus 200, various functions are achieved. Each information processing apparatus 200 may be implemented by a main-frame computer, a personal computer, or a work station.

In FIG. 1, information processing apparatuses (1)200 to (3)200 are connected to the storage-device control apparatus 100 via a LAN (Local Area Network) 400. The LAN 400 may be implemented by the Internet or a dedicated network. Communication between the information processing apparatuses (1)200 to (3)200 and the storage-device control apparatus 100 via the LAN 400 is established in accordance with a TCP/IP protocol, for example. From the information processing apparatuses (1)200 to (3)200 to the disk array device 600, a data access request designating a file name is transmitted.

The storage-device control apparatus 100 includes channel controlling units (1)110 to (4)100. The storage-device control apparatus 100 accepts each file access request from the information processing apparatuses (1)200 to (3)200 via the LAN 400 by the channel controlling units (1)110 to (4)110. That is, each of the channel controlling units (1)110 to (4)110 is assigned with a network address (for example, an IP address) on the LAN 400, and behaves as an individual NAS, thereby allowing a service as the NAS to be provided to the information processing apparatuses (1)200 to (3)200 so that the independent NAS may exist. Thereby, the disk array device 600 can be controlled in a centralized manner, and the efficiency of maintenance tasks such as various setting and control, failure management, and version management is improved.

Note that the channel controlling units (1)110 to (4)110 of the storage-device control apparatus 100 according to the present embodiment is achieved by software, such as an operating system (hereinafter also abbreviated as "OS") to be executed by hardware formed on a circuit board integrally unitized, an application program operating on this OS, or executable object code to be executed by the hardware. Therefore, in the disk array device 600 according to the present embodiment, a flexible system operation is usable, and therefore it is possible to provide services more suitable for the wide variety of user needs which change frequently.

The information processing apparatuses (3)200 to (4)200 are connected to the storage-device control apparatus 100 via a SAN (Storage Area Network) 500. The SAN 500 is a network for transmitting and receiving data with the information processing apparatuses (3)200 to (4)200 in units of blocks, which are data management units in storage areas provided by the storage devices 300. Communication between the information processing apparatuses (3)200 to (4)200 and the storage-device control apparatus 100 via the SAN 500 is established generally in accordance with a fiber-channel protocol. From the information processing apparatuses (3)200 to (4)200 to the disk array device 600, a data access request in units of blocks is transmitted in accordance with the fiber-channel protocol.

The storage-device control apparatus 100 performs communication with the information processing apparatuses (3)200 to (4)200 via the channel controlling units (5)110 to (6)110.

The information processing apparatus (5)200 is connected to the storage-device control apparatus 100 without interposing a network such as the LAN 400 or the SAN 500. The information processing apparatus (5)200 can be implemented by, for example, a main-frame computer. Communication between the information processing apparatus (5)200 and the storage-device control apparatus 100 is performed in accordance with a communication protocol, such as FICON (Fibre Connection) (registered trademark), ESCON (Enterprise System Connection) (registered trademark), ACONARC (Advanced Connection Architecture) (registered trademark), or FIBARC (Fibre Connection Architecture). From the information processing apparatus (5)200 to the disk array device 600, a block access request is transmitted in accordance with the communication protocols.

The storage-device control apparatus 100 performs communication with the information processing apparatus (5)200 via the channel controlling units (7)110 and (8)110.

The SAN 500 is connected to another disk array device 610 installed at a place relatively close to the installation place of the disk array device 600 (such a place is referred to as a local site) and still another disk array device 620 installed at a place a long distance away from the installation place of the disk array device 600 (such a place is referred to as a remote site). The disk array devices 610 and 620 are used as copy-destination apparatuses in replication or a remote-copying function. Note that the disk array devices 610 and 620 may be connected to the disk array device 600 via a communication line such as an ATM in addition to the SAN 500. In this case, for example, channel controlling units including an interface (channel extender) for using such a communication line as mentioned above are adopted as the channel controlling units 110.

<Storage Device>

The storage device 300 includes a plurality of disk drives (physical disks) for providing storage areas to the information processing apparatuses 200. Data is stored in the LU, which is the storage area logically set on the physical storage area provided by the disk drive. As the disk drive, various types of devices can be used, such as hard disk devices, flexible disk devices, and semiconductor storage devices. Also, for example, the storage device 300 may form a disk array with a plurality of disk drives. In this case, the storage areas provided to the information processing apparatuses 200 can be achieved by a plurality of disk drives managed by a RAID (Redundant Array of Inexpensive Disks).

The storage-device control apparatus 100 and the storage devices 300 may be connected, for example, directly as shown in FIG. 1, or via a network. Furthermore, the storage devices 300 may be formed integrally with the storage-device control apparatus 100.

<Storage-Device Control Apparatus>

The storage-device control apparatus 100 includes, as shown in FIG. 1, the channel controlling units 110, a shared memory 120, a cache memory 130, disk controlling units 140, a management terminal 160, and a connecting unit 150.

The channel controlling unit 110 includes a communication interface for communication with the information processing apparatus 200, and includes a function of transmitting to and receiving from the information processing apparatus 200 a data input/output command. For example, some of the channel controlling units 110 accepts a file access request from each of the information processing apparatuses (1)200 to (3)200. Thereby, the disk array device 600 can provide a service as the NAS to the information processing apparatuses (1)200 to (3)200. Also, some of the channel controlling units 110 accepts a block access request from the information processing apparatuses (3)200 and (4)200 in accordance with a fiber channel protocol. Thereby, the disk array device 600 can provide a service of storing data for high-speed access to the information processing apparatuses (3)200 and (4)200. Furthermore, some of the channel controlling units 110 accepts a block access request from the information processing apparatus (5)200 in accordance with a protocol such as FICON, ESCON, ACONARC, or FIBERC. Thereby, the disk array device 600 can provide a data storage service even to a main-frame computer such as the information processing apparatus (5)200.

The channel controlling units 110 are connected to one another and also to the management terminal 160 via a communication network such as an internal LAN 151. Thereby, a microprogram to be executed by the channel controlling units 110 or the like can be transmitted from the management terminal 160 for install.

The connecting unit 150 is connected to the channel controlling units 110, the shared memory 120, the cache memory 130, and the disk controlling units 140. Transmission and reception of data or commands among the channel controlling units 110, the shared memory 120, the cache memory 130, and the disk controlling units 140 are performed via the connecting unit 150. The connecting unit 150 is formed by a switch for data transfer with high-speed switching, such as a superspeed crossbar switch, or a bus. Since the channel controlling units 110 are connected with one another via the switch, communication performance among the channel controlling units 110 is significantly improved compared with the conventional structure in which NAS servers operating on the respective computers are connected via a LAN. Also, for this reason, a high-speed file sharing function or high-speed failover can be achieved.

The shared memory 120 and the cache memory 130 are storage memories shared by the channel controlling units 110 and the disk controlling units 140. The shared memory 120 is used mainly for storing control information and commands while the cache memory 130 is used mainly for storing data.

For example, when a data input/output command received by one of the channel controlling units 110 from the information processing apparatus 200 is a write command, the channel controlling unit 110 writes the write command in the shared memory 120 and writes data received from the information processing apparatus 200 for writing in the cache memory 130. On the other hand, the disk controlling units 140 monitor the shared memory 120, and upon detecting the fact that the write command has been written in the shared memory 120, one or more of the disk controlling units 140 read the written data from the cache memory according to the command and then write the command in one or more of the storage devices 300.

Also, for example, when a data input/output command received by one of the channel controlling units 110 from the information processing apparatus 200 is a read command, the channel controlling unit 110 writes the read command in the shared memory 120 and reads data requested with the read command from the information processing apparatus 200 for reading from the cache memory 130. If the data requested with the read command has not been written in the cache memory 130, one or more of the channel controlling units 110 or one or more of the disk controlling units 140 read the data requested with the read command from the storage devices 300, and then write the data in the cache memory 130.

Note that, in the present embodiment, the shared memory 120 and the cache memory 130 are provided independently from the channel controlling units 110 and the disk controlling units 140. This is not meant to be restrictive. It is also preferable that the shared memory 120 or the cache memory 130 be provided to each of the channel controlling units 110 and each of the disk controlling units 140 in a distributed manner. In this case, the connecting unit 150 interconnects the channel controlling units 110 and the disk controlling units 140 each having the shared memory 120 or the cache memory 130 provided in a distributed manner.

The disk controlling units 140 control the storage devices 300. For example, as described above, the disk controlling units 140 write data to the storage devices 300 in accordance with a data write command received by the channel controlling unit 110 from the information processing apparatus 200. Also, the disk controlling units 140 convert a request having a specified logical address transmitted from the channel controlling unit 110 into a request with a specified physical address for data access to a physical disk. When the physical disks in the storage devices 300 are managed by a RAID, a data access is performed in accordance with the RAID structure. Also, the disk controlling units 140 perform duplication-management control and backup control over the data stored in the storage devices 300. Furthermore, the disk controlling units 140 also perform, for example, such control that, for the purpose of preventing data loss at a time of occurrence of disaster (disaster recovery) or other purposes, a duplication of data in the disk array device 600 at a production site is also caused to be stored in other disk array devices 610 and 620 placed at the local site and the remote site (replication function or remote-copying function).

The disk controlling units 140 are connected to one another and also to the management terminal 160 via a network such as the internal LAN 151, thereby communicating with one another. Thereby, a microprogram to be executed by the disk controlling units 140 or the like can be transmitted from the management terminal 160 for install.

<Management Terminal>

The management terminal 160 is a computer for maintenance and management of the disk array device 600. By operating the management terminal 160, for example, the structure of the physical disk in the storage device 300 can be set, the LU can be set, and the microprograms to be executed in the channel controlling unit 110 and the disk controlling unit 140 can be installed. Here, the structure of the physical disk in the storage device can be set so that, for example, the number of physical disks is increased or decreased or the RAID structure is changed (for example, from RAID 1 to RAID 5).

Furthermore, from the management terminal 160, an operating state of the disk array device 600 can be checked, a failed portion can be specified, and a task of installing an OS to be executed in the channel controlling unit 110. Also, the management terminal 160 is connected to an external maintenance center via a LAN or a telephone line. Therefore, by the use of the management terminal 160, it is possible to monitor failure in the disk array device 600 and promptly deal with the failure when the failure occurs. The occurrence of the failure is reported from, for example, an OS, an application program, or driver software. This report is issued in accordance with an HTTP protocol or an SNMP (Simple Network Management Protocol), or via e-mail. These setting and control are performed by an operator using a Web page that is provided by a Web server operating at the management terminal 160 as a user interface. The operator or the like can also operate the management terminal 160 to set an object and a content to be monitored for failure and a failure-report destination.

The management terminal 160 may be incorporated in the storage-device control apparatus 100 or may be externally provided. Also, the management terminal 160 may be a computer dedicated for maintenance and management of the storage-device control apparatus 100 and the storage devices 300, or may be a general-purpose computer having maintenance and management functions.

<Structure of Principal Portions of Data Processing System>

Figure 2:
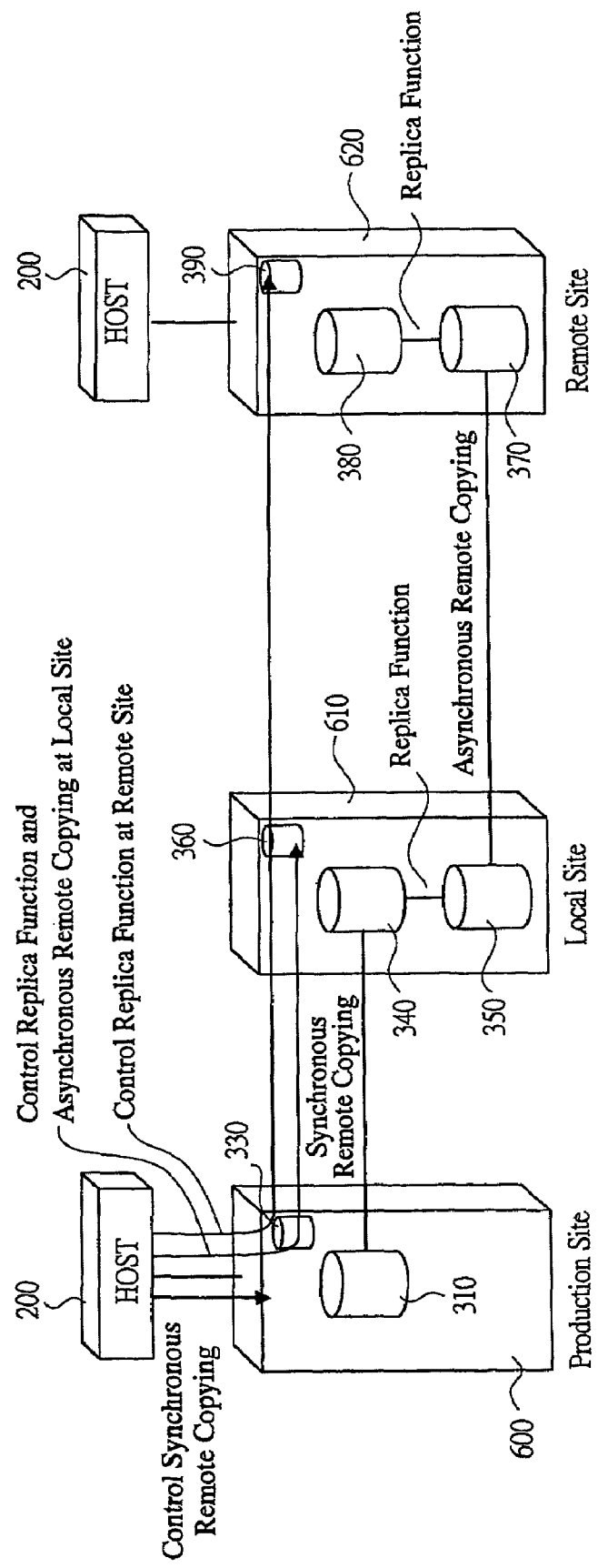
FIG. 2 is a diagram showing a structure of a principal portion of a data processing system according to the embodiment of the present invention.

With reference to FIG. 2, an example of a structure of a principal portion of the data processing system according to the present embodiment will be described. FIG. 2 is a diagram showing the structure of the principal portion of the data processing system according to the embodiment of the present invention.

The data processing system according to the present embodiment includes a plurality of disk array devices having: the storage devices 300 in which a plurality of logical volumes for storing data are set; and the channel controlling units 110 and the disk controlling units 140 as controlling units for controlling the storing of data in the logical volumes set in the storage devices 300. The data processing system has at least three disk array devices 600, 610, and 620, wherein a first disk array device 600 is placed at a production site and a second disk array device 610 is placed at a local site and a third disk array device 620 is placed at a remote site, so that this configuration allows bidirectional data transfer among the disk array devices 600, 610, and 620.

In the configuration of this data processing system, the controlling unit of the disk array device 600 at the production site has a function of: receiving a command having a remote-command function issued from a host ("upper apparatus"="information processing apparatus 200") connected to its own disk array device 600; thereafter analyzing it; and performing the followings. That is, if the command includes an instruction command for remote transfer to the disk array device 610 at the local site, the controlling unit transfers this command to the disk array device 610. If the command does not include such an instruction command, the controlling unit performs a process within its own device. The controlling unit of the disk array device 610 at the local site has a function of: receiving the command having the remote-command function transferred from the disk array device 600 at the production site; thereafter analyzing it; and performing the followings. That is, if the command includes an instruction command for remote transfer to the disk array device 620 at the remote site, the controlling unit transfers this command to the disk array device 620. If the command does not include such an instruction command, the controlling unit performs a process within its own device. The controlling unit of the disk array device 620 at the remote site has a function of: receiving the command having the remote-command function transferred from the disk array device 610 at the local site; and performing a process within its own device.

That is, as shown in FIG. 2, in the production site, in the local site which is relatively close to the production site, and in the remote site which is a long distance away from the production site, the main configuration of the data processing system according to the present embodiment achieves long-distance remote copying due to no data loss from the disk array device 600 at the production site to the disk array device 620 at the remote site via the disk array device 610 at the local site in combination with synchronous remote copying and asynchronous remote copying. In the event that the production site is damaged by disaster, operations can be continued at the local site having the same data and at the remote site a long distance away from the production site.

Note that a description will be mainly made of a "3 Data Center (3DC)" Cascading configuration including the production site, the local site, and the remote site. However, as with the 3DC, the present invention can be applied to 4DC and 5DC with state control that will be described below.

Synchronous remote copying from the disk array device 600 at the production site to the disk array device 610 at the local site is a remote-copying scheme in synchronization with a write command from a host 200. That is, between the disk array device 600 and the disk array device 610, copying is performed from a volume 310 (primary volume) of the disk array device 600 at the production site to a volume 340 (secondary volume) of the disk array device 610 at the local site.

Asynchronous remote copying from the disk array device 610 at the remote site to the disk array device 620 at the remote site is a remote-copying scheme of transferring data to the remote site asynchronous to a write command from the host 200. That is, between the disk array device 610 and the disk array device 620, copying is performed from a volume 350 (primary volume) of the disk array device 610 at the local site to a volume 370 (secondary volume) of the disk array device 620 at the remote site. In this asynchronous remote copying, order of updated data is ensured.

Also, in the disk array device 610 at the local site and the disk array device 620 at the remote site, copying is performed with a replica function. That is, inside the disk array device 610 at the local site, copying is performed from the volume 340 (primary volume) to the volume 350 (secondary volume). Also, inside the disk array device 620 at the remote site, copying is performed from the volume 370 (primary volume) to a volume 380 (secondary volume).

Note that the command having the remote command function issued from the host 200 includes a control command to the disk array device 600 at the production site for synchronous remote copying, a control command to the disk array device 610 at the local site for asynchronous remote copying, and a control command to the disk array device 620 for the replica function. In the disk array device 600, a volume 330 is set for a command device which issues a control command for synchronous remote copying. In the disk array device 610, a volume 360 is set for a command device which issues a control command for asynchronous remote copying and a control command having a replica function. In the disk array device 620, a volume 390 is set for a command device that issues a control command having a replica function.

The summary of a data flow in these production site, local site, and remote site is as follows.

(1) Updated data at the production site is transferred in a synchronous mode to the local site through the synchronous remote copying.

(2) Data at the local site is regularly transferred to the remote site through the replica function and the asynchronous remote copying. That is, by alternately repeating the replica function and the asynchronous remote copying through "Resync"→"Split (Suspend)", a difference occurring after updating is moved to the secondary volume in the replica function at the local site and the secondary volume in the asynchronous remote copying at the remote site. Note that "Resync" means resynchronization of the split pair volume by the primary volume, and "Split (Suspend)" means to split the pair state and make the secondary volume readable and writable.

(3) As mentioned above, transfer of updated data to the remote site is a regularly copying process. Therefore, since the order of data in the copying process is not ensured, data with consistency is kept by the replica function.

Also, all of these controls can be performed from the production site. Originally, commands from the host can be executed only by the disk array devices connected to the host. That is, the host of the production site can issue commands only to the disk array device at the production site. Therefore, the remote command function is used so that the command issued to the production site can be executed at the local site or remote site. That is, the host 200 of the production site can collectively control the disk array devices 600, 610, and 620 at all sites.

<System Configuration>

Figure 3:
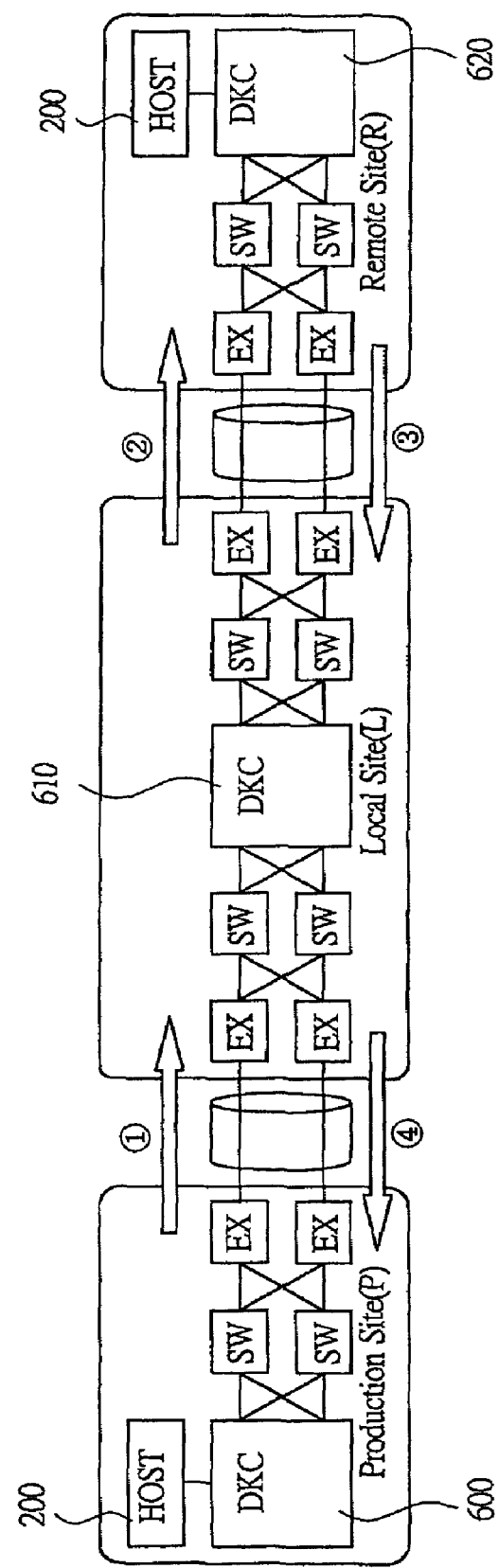
FIG. 3 is a diagram showing a link configuration among disk array devices in the embodiment of the present invention.

With reference to FIG. 3, an example of a link configuration among the disk array devices in the data processing system according to the present embodiment will be described. FIG. 3 is a diagram showing a link configuration among the disk array devices according to the embodiment of the present invention. Note that encircled numerals indicative of links in FIG. 3 are denoted as simple numerals in the specification.

As shown in FIG. 3, among the disk array devices (DKC) 600, 610 and 620, a link between the disk array devices at the production site and the local site and a link between the disk array devices at the local site and the remote site are assumed to be configured as bidirectional links by considering failover at a time of occurrence of disaster and failback at the time of recovery from the disaster. Note that, in order to allow a configuration having no host at the local site, a pair of remote copying and a replica function is collectively controlled by the host 20 at the production site at the time of normal task operation (task operation at the production site) and, at the time of disaster, the pair is collectively controlled by the remote site. Also, note that, in FIG. 3, reference symbol "SW" denotes a switch, and "EX" denotes an extender.

Objects of the links among the disk array devices 600, 610, and 612 are classified as the following items 1 to 4. Item 1 indicates a link between the disk array devices 600 and 610 directed to the "production site"→"local site", and the link is used at a normal time. An intended purpose thereof is to perform data transfer by the synchronous remote copying of links 1→2 and perform pair control to the local site and the remote site from the production site. Item 2 indicates a link between the disk array devices 610 and 620 directed to the "local site"→"remote site", and the link is used at a normal time. An intended purpose thereof is to perform data transfer by the asynchronous remote copying of links 3→4 and perform pair control to the remote site from the production site. Item 3 indicates a link between the disk array devices 620 and 610 directed to the "remote site"→"local site", and the link is used at a failover time. An intended purpose thereof is to perform pair control to the production site and the local site from the remote site, and to perform data transfer by the asynchronous remote copying of links 4→3 and pair control to the local site from the remote site. Item 4 indicates a link between the disk array devices 610 and 600 directed to the "local site"→"production site", and the link is used at a failback time. An intended purpose thereof is to perform data transfer by the synchronous remote copying of links 2→1, and pair control to the local site and the production site from the remote site. Note that each link of the Items 1 to 3 has to be always established for being in readiness for occurrence of disaster. However, the link of the Item 4 is a path required at the time of failback, and is not always required.

Also, paths of data transfer and control instruction on the links among the disk array devices 600, 610, and 620 are as follows. In a normal task operation at the production site, a data transfer path is the links 1 and 2 of the "production site"→"local site"→"remote site", and a control instruction path is the link 1 of the "production site"→"local site" and the links 1 and 2 of the "production site"→("local site")→"remote site". For failover, a data transfer path is the link 2 of the "local site"→"remote site", and a control instruction path is the link 3 of the "remote site"→"local site". At the time of performing tasks at the remote site, a data transfer path is the link 3 of the "remote site"→"local site", and a control instruction path is the link 3 of the "remote site"→"local site". For failback, a data transfer path is the links 3 and 4 of the "remote site"→"local site"→"production site", and a control instruction path is the link 3 of the "remote site"→"local site" and the links 3 and 4 of the "remote site"→("local site")→"production site".

<Operation Outline>

Figure 4:
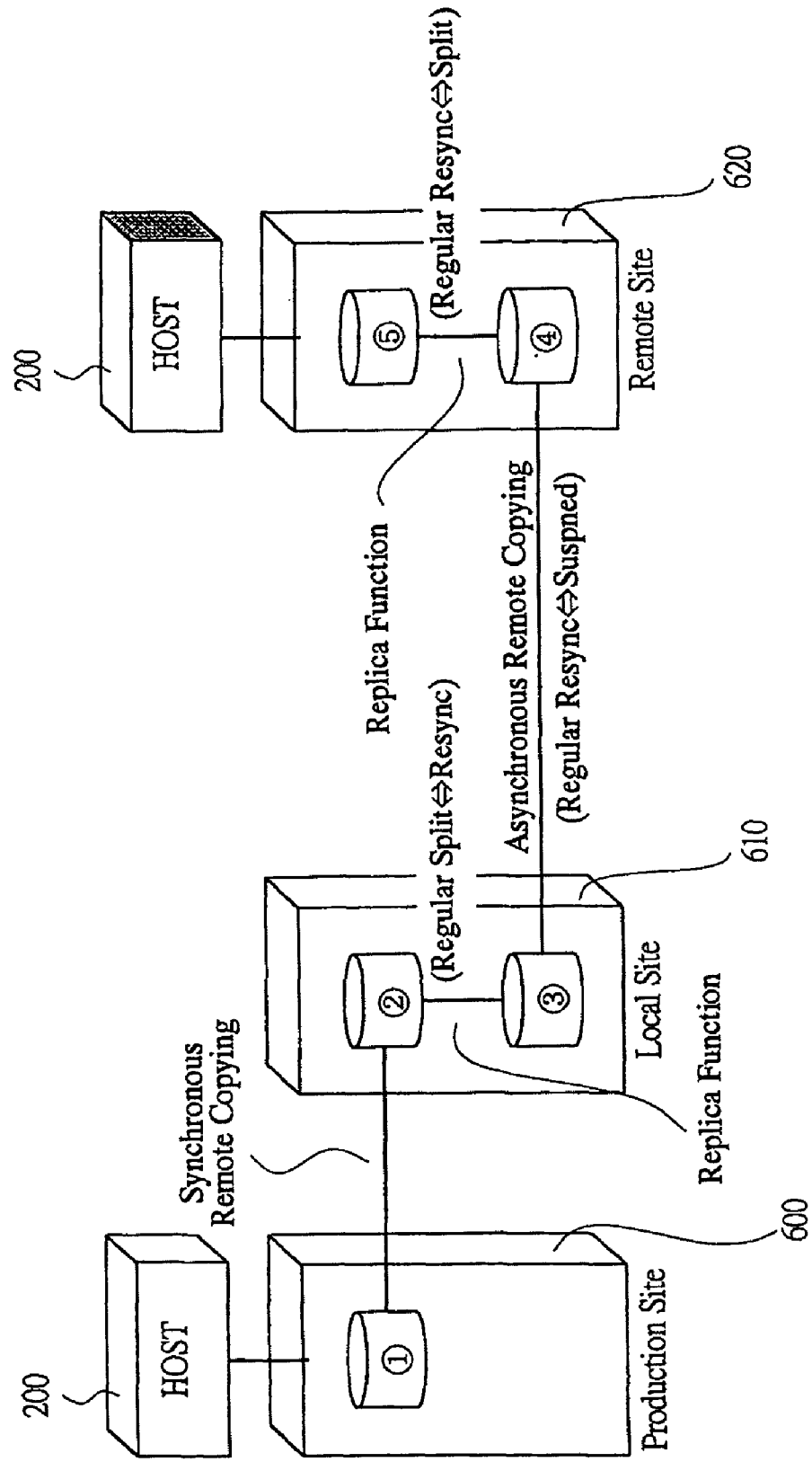
FIG. 4 is a diagram showing the concept of a remote copying operation in the embodiment of the present invention.

With reference to FIG. 4, an example of a remote copying operation will be described. FIG. 4 is a diagram showing a concept of a remote copying operation. Note that encircled numerals indicative of volumes in FIG. 4 are denoted as simple numerals in the specification. Also, volumes 1, 2, 3, 4, and 5 correspond to volumes 310, 340, 350, 370, and 380 in FIG. 2, respectively.

As shown in FIG. 4, in a remote copying operation in the 3DC Cascading structure as described above, write data from the host 200 at the production site is transferred on real-time basis from the disk array device 600 at the production site to the disk array device 610 at the local site through the synchronous remote copying. As for data at the local site, by alternately repeating a pair state of the replica function and the asynchronous remote copying through "Resync"→"Split (Suspend)", differential data is transferred to the disk array device 620 at the remote site. Operation outline will be described as follows.

(1) Synchronous remote copying between the volumes 1 and 2 is always in a pair state.

(2) A replica function between the volumes 2 and 3, synchronous remote copying between the volumes 3 and 4, and a replica function between the volumes 4 and 5 are in cooperation with one another to regularly move data in the following procedure. (a) Split the replica function between the volumes 2 and 3 (ensuring consistency between a plurality of volumes), and confirm division of all the volumes ("replica function state between the volumes 1 and 2"="Split state"; "replica function state between the volumes 4 and 5"="state transition to a Split state"); (b) Data transfer of asynchronous remote copying between the volumes 3 and 4 to the "Resync & Suspend"→"remote site" (transferring differential data); (c) Movement of the replica function between the volumes 2 and 3 to updated data from the "Resync"→"production site" (transferring differential data); and (d) In "Resync & Split the replica function between the volumes 4 and 5"→"a Resync processing of asynchronous remote copying", consistency is not ensured, so that, in order to retain data in which the consistency is ensured, the above Items (a) to (d) are repeatedly performed.

(3) Operation at Disaster

For example, when only the production site stops functioning, the latest data in the volume 2 is moved to the remote site by performing the above Items (a) to (d), and then the tasks are resumed at the remote site. Also, at the time of a local disaster where the production site and the local site stop functioning, data in the volume 5 or 4 is used to resume the tasks at the remote site. However, data in a cycle time is lost.

Hereinafter, as a specific procedure of controlling a copy pair state, there will be shown: (1) an initial copy establishing procedure; (2) a copying procedure at normal operations; (3) a failover procedure at a time of disaster or a maintenance check of the production site; and (4) a failback procedure at the time of recovery from disaster or at the end of a maintenance check of the production site. Pair-state transition conditions in the synchronous remote copying, the replica function, the asynchronous remote copying, on which the pair operations as mentioned above are predicated, are as follows.

(i) The replica function between the volumes 2 and 3 and the asynchronous remote copying between the volumes 3 and 4 cannot be simultaneously made in a Duplex state. Only when one of them is in a Suspend/Split state, the other can be made in a Duplex state.

(ii) The asynchronous remote copying between the volumes 3 and 4 and the replica function between the volumes 4 and 5 can be simultaneously made in a Duplex state. However, the asynchronous remote copying is an operation of repeating the "Resync"→"Suspend", and data consistency cannot be ensured in the Resync process. Therefore, only one of them is in a Suspend/Split state, the other can be mad in a Duplex state.

A command for controlling the state of each pair at normal operations can operate in units of groups. With a series of operations, the state is automatically controlled by storage management software at the host based on configuration definition information.

<Initial Copy Establishing Procedure>

With reference to FIG. 5, an example of the initial copy establishing procedure will be described. FIG. 5 is a diagram showing a pair-state establishing procedure in the initial copy establishing procedure. Note that the initial copy establishing procedure will be described with reference to FIG. 4 described above.

The initial copy establishing procedure at the time of system construction is as follows.

The procedure goes in order of: (1) establishing a synchronous remote copy pair of the "production site"→"local site" (between the volumes 1 and 2); (2) establishing a replica function pair in the local site (between the volumes 2 and 3); (3) establishing an asynchronous remote copy pair of the "local site"→"remote site" (between the volumes 3 and 4); and (4) establishing a replica function pair in the remote site (between the volumes 4 and 5).

The states of each pair before and after the initial copy establishing operation are as follows. (i) As for the synchronous remote copy pair of the "production site"→"local site", the state of the pair before the initial copying is in a Simplex state while the state of the pair after the initial copying is in a Duplex state. Similarly, (ii) as for the replica function pair in the local site, the state of the pair before the initial copying is in a Simplex state while the state of the pair after the initial copying is in a Duplex state. (iii) As for the asynchronous remote copy pair of the "local site"→"remote site", the state of the pair before the initial copying is in a Simplex state while the state of the pair after the initial copying is in a Suspend state. (iv) As for the replica function pair in the remote site, the state of the pair before the initial copying is in a Simplex state while the state of the pair after the initial copying is in a Duplex state.

Furthermore, in the pair-state establishing procedure, the following processes are performed as shown in FIG. 5 from the initial state of: issuing an instruction for establishing a pair of the volumes 1→2; issuing an instruction for establishing a pair of the volumes 2→3; issuing an instruction for Suspend of the volumes 2→3; issuing an instruction for establishing a pair of the volumes 3→4; issuing an instruction for Suspend of the volumes 3→4; issuing an instruction for Resync of the volumes 2→3, and issuing an instruction for establishing a pair of the volumes 4→5.

For example, in the initial state, the synchronous remote copying between the volumes 1 and 2, the replica function between the volumes 2 and 3, the asynchronous remote copying between the volumes 3 and 4, and the replica function between the volumes 4 and 5 are all in Simplex states. Then, in the process of issuing an instruction for establishing a pair of volumes 1→2, the synchronous remote copying between the volumes 1 and 2 becomes in the state of "Simplex"→"Duplex" "Pending"→"Duplex". In the process of issuing an instruction for establishing a pair of volumes 2→3, the replica function between the volumes 2 and 3 becomes in the sate of: "Simplex"→"Duplex Pending"→"Duplex". In the process of issuing an instruction for Suspend of the volumes 3→4, the replica function between the volumes 2 and 3 becomes in the state of: "Duplex"→"Splitting"→"Split". In the process of issuing an instruction for establishing a pair of volumes 3→4, the asynchronous remote copying between the volumes 3 and 4 becomes in the state of: "Simplex"→"Duplex Pending"→"Duplex". In the process of issuing an instruction for Suspend of the volumes 3→4, the asynchronous remote copying between the volumes 3 and 4 becomes in the state of: "Duplex"→"Suspending"→"Suspend". In the process of issuing an instruction for Resync of the volumes 2→3 and the process of issuing an instruction for establishing a pair of volumes 4→5, the replica function between the volumes 2 and 3 becomes in the state of: "Split"→"Duplex Pending (Resyncing)"→"Duplex" and the replica function between the volumes 4 and 5 becomes in the state of: "Simplex"→"Duplex Pending"→"Duplex".

Note that, in the process of issuing an instruction for Suspend of the volumes 2→3, in order to ensure data consistency, a Split instruction is issued to the replica function between the volumes 2 and 3 during Freeze, which will be described below. In the process of issuing an instruction for establishing a pair of volumes 3→4, after all the replica function pairs between the volumes 2 and 3 carry out the transition to a Split state, a Suspend instruction has to be issued to the asynchronous remote copying between the volumes 3 and 4. In the process of issuing an instruction for Resync of the volumes 2→3 and the process of issuing an instruction for establishing a pair of volumes 4→5, after all the asynchronous remote copy pairs between the volumes 3 and 4 carry out the transition to a Suspend state, the replica function between the volumes 2 and 3 and the replica function between the volumes 4 and 5 have to be operated.

<Copy Procedure at Normal Operation>

With reference to FIGS. 6 to 8, an example of the copying procedure at a normal operation will be described. FIG. 6 is a diagram showing a procedure of sequentially causing a state transition of each pair in a copying procedure at a normal operation. FIG. 7 is a diagram showing a procedure of simultaneously controlling a replica function between volumes 2 and 3 and a replica function between volumes 4 and 5. FIG. 8 is a diagram showing a procedure of simultaneously controlling the process of issuing an instruction for Split and a process of issuing an instruction for Resync of a replica function between volumes 2 and 3 and a replica function between volumes 4 and 5.

The copying procedure at a normal operation is as follows.

(1) Split the replica function in the local site (between the volumes 2 and 3) (ensure the consistency between a plurality of volumes)→Confirm synchronization of all the volumes ("stat transitions to the state of the replica function between the volumes 1 and 2"="Split state" and "the state of the replica function between the volumes 4 and 5"="Split state"); (2) Resync & Suspend the asynchronous remote copying of the local site→the remote site (between the volumes 3 and 4)→move data to the remote site (transferring differential data); (3) Resync the replica function in the local site (between the volumes 2 and 3)→move updated data from the production site (transferring differential data); (4) Resync & Split the replica function in the remote site (between the volumes 4 and 5)→the consistency is not ensured during the Resync process of the asynchronous remote copying, so that data in which consistency is ensured is retained.

In the copying operation at normal utilization, scheme 1: a procedure for sequentially causing a state transition of each pair is shown in FIG. 6. Scheme 2: a procedure for simultaneously controlling Resync instructions of the replica function between the volumes 2 and 3 and of the replica function between the volumes 4 and 5 is shown in FIG. 7. Scheme 3: a procedure for simultaneously controlling a Split instruction and a Resync instruction of the replica function between the volumes 2 and 3 and the replica function between the volumes 4 and 5 is shown in FIG. 8.

In the scheme 1, the procedure for sequentially causing a state transition of each pair is performed as follows as shown in FIG. 6. That is, from an initial state, there are executed: a Split instruction of the volumes 4→5; a Split instruction of the volumes 2→3; a Suspend instruction of the volumes 3→4; a Resync instruction of the volumes 4→5; and a Resync instruction of the volumes 2→3.

For example, in the initial state, the synchronous remote copying between the volumes 1 and 2; the replica function between the volumes 2 and 3; and the replica function between the volumes 4 and 5 are in Duplex states, whereas the asynchronous remote copying between the volumes 3 and 4 is in a Suspend state. Then, in the process of issuing a Split instruction of the volumes 4→5, the replica function between the volumes 4 and 5 becomes in a state of Duplex→Splitting→Split. In the process of issuing a Split instruction of the volumes 2→3, the replica function between the volumes 2 and 3 becomes in a state of Duplex→Splitting→Split. In the process of issuing a Resync instruction of the volumes 3→4, the asynchronous remote copying between the volumes 3 and 4 becomes in a state of Suspend→Duplex Pending (Resyncing)→Duplex. In the process of issuing a Suspend instruction of the volumes 3→4, the asynchronous remote copying between the volumes 3 and 4 becomes in a state of Duplex→Suspending→Suspend. In the process of issuing a Resync instruction of the volumes 4→5, the replica function between the volumes 4 and 5 becomes in a state of Split→Duplex Pending (Resyncing) →Duplex. In the process of issuing a Resync instruction of the volumes 2→3, the replica function between the volumes 2 and 3 becomes in a state of Split→Duplex Pending (Resyncing)→Duplex.

Note that, in the initial state, state transitions are started after the states shown in FIG. 6 are confirmed. In the process of issuing an instruction of the volumes 2→3, in order to ensure data consistency, a Split instruction is issued to the replica function between the volumes 2 and 3 during Freeze. In the process of issuing a pair Resync instruction of the volumes 3→4, after all the replica function pairs between the volumes 2 and 3 transit to Split states, a Suspend instruction has to be issued to the asynchronous remote copying between the volumes 3 and 4. In the process of issuing a Resync instruction of the volumes 4→5, after all the asynchronous remote copy pairs between the volumes 3 and 4 transit to Suspend states, a Resync instruction has to be issued to the replica function between the volumes 4 and 5.

In the scheme 2, the procedure for simultaneously controlling a process of issuing Resync instructions of the replica function between the volumes 2 and 3 and of the replica function between the volumes 4 and 5 is executed as follows as shown in FIG. 7. That is, from an initial state, there are executed: a Split instruction of the volumes 4→5; a Split instruction of the volumes 2→3; a Resync instruction of the volumes 3→4; a Suspend instruction of the volumes 3→4; a Resync instruction of the volumes 4→5; and a Resync instruction of the volumes 2→3.

Note that, in the initial state, state transitions are started after the states as shown in FIG. 7 are confirmed. In the process of issuing a Split instruction of the volumes 2→3, in order to ensure data consistency, a Split instruction is issued to the replica function between the volumes 2 and 3 during Freeze. In the process of issuing a pair Resync instruction of the volumes 3→4, after all the replica function pairs between the volumes 2 and 3 transit to Split states, a Suspend instruction has to be issued to the asynchronous remote copying between the volumes 3 and 4. In the process of issuing a Resync instruction of the volumes 4→5 and the process of issuing a Resync instruction of the volumes 2→3, after all the asynchronous remote copy pairs between the volumes 3 and 4 transit to Suspend states, a Resync instruction has to be issued to the replica function between the volumes 2 and 3 and the replica function between the volumes 4 and 5.

In the third scheme, a procedure for simultaneously controlling the process of issuing a Split instruction and the process of issuing a Resync instruction of the replica function between the volumes 2 and 3 and the replica function between the volumes 4 and 5 is executed as follows as shown in FIG. 8. That is, from an initial state, there are executed: a Split instruction of the volumes 2→3; a Split instruction of the volumes 4→5; a Resync instruction of the volumes 3→4; a Suspend instruction of the volumes 3→4; a Resync instruction of the volumes 4→5; and a Resync instruction of the volumes 2→3.

Note that, in the initial state, state transitions are started after the states shown in FIG. 8 are confirmed. In the process of issuing a Split instruction of the volumes 2→3 and the process of issuing a Split instruction of the volumes 4→5, in order to ensure data consistency, a Split instruction is issued to the replica function between the volumes 2 and 3 during Freeze. Note that the operation of the replica function between the volumes 4 and 5 does not have to be performed during Freeze. In the process of issuing a Resync instruction of the volumes 3→4, after all the replica function pairs between the volumes 2 and 3 transit to Split states, a Suspend instruction has to be issued to the asynchronous remote copying between the volumes 3 and 4. In the process of issuing a Resync instruction of the volumes 4→5 and the process of issuing a Resync instruction of the volumes 2→3, after all the asynchronous remote copy pairs transit to Suspend states, a Resync instruction has to be issued to the replica function between the volumes 2 and 3 and the replica function between the volumes 4 and 5.

<Recovering Procedure at Occurrence of Disaster>

Figure 9:
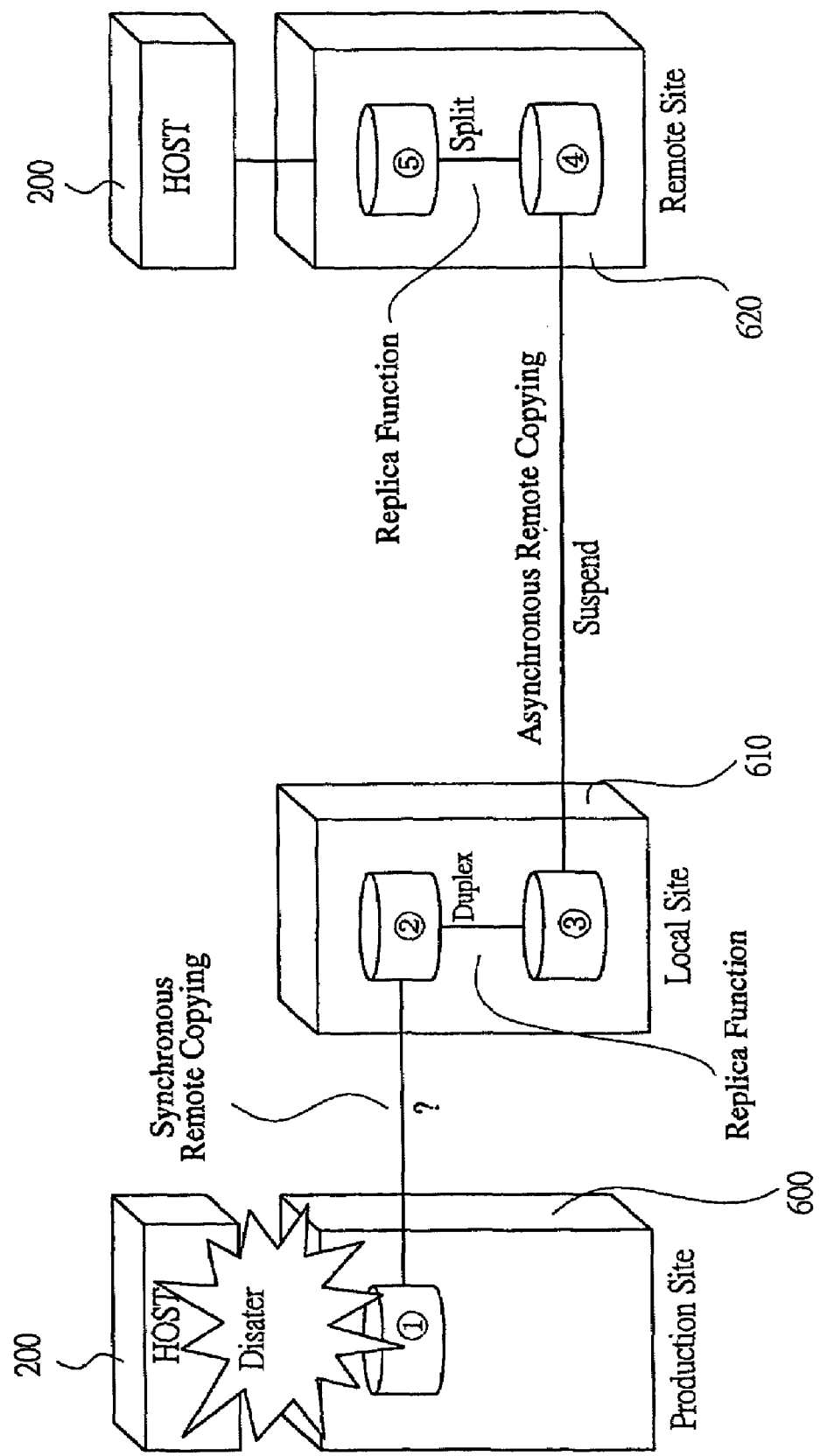
FIG. 9 is a diagram showing a state of starting failover in a recovering procedure at a time of occurrence of disaster.
Figure 12:
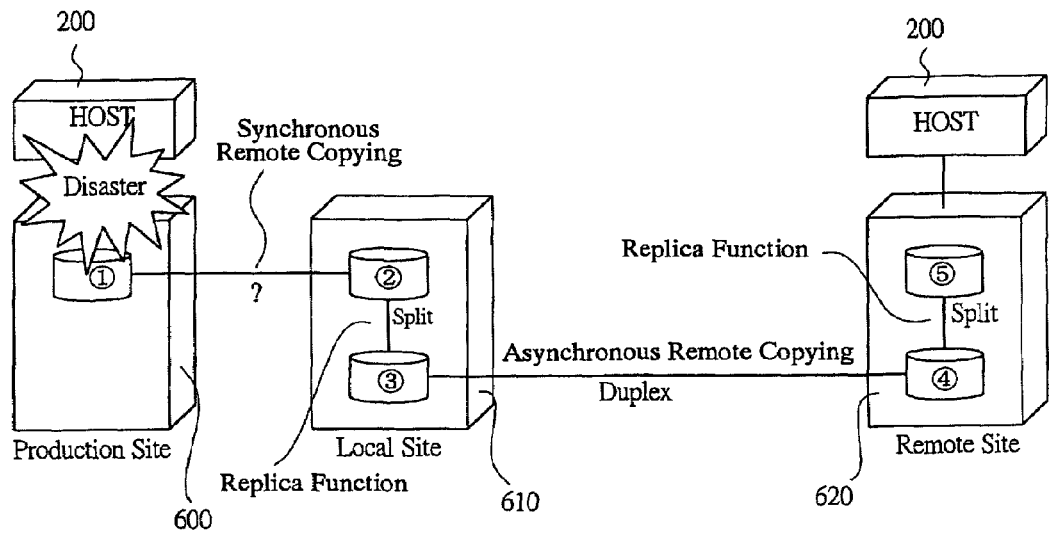
FIG. 12 is a diagram showing a state of each pair at a time of completing data transfer in the embodiment of the present invention.
Figure 13:
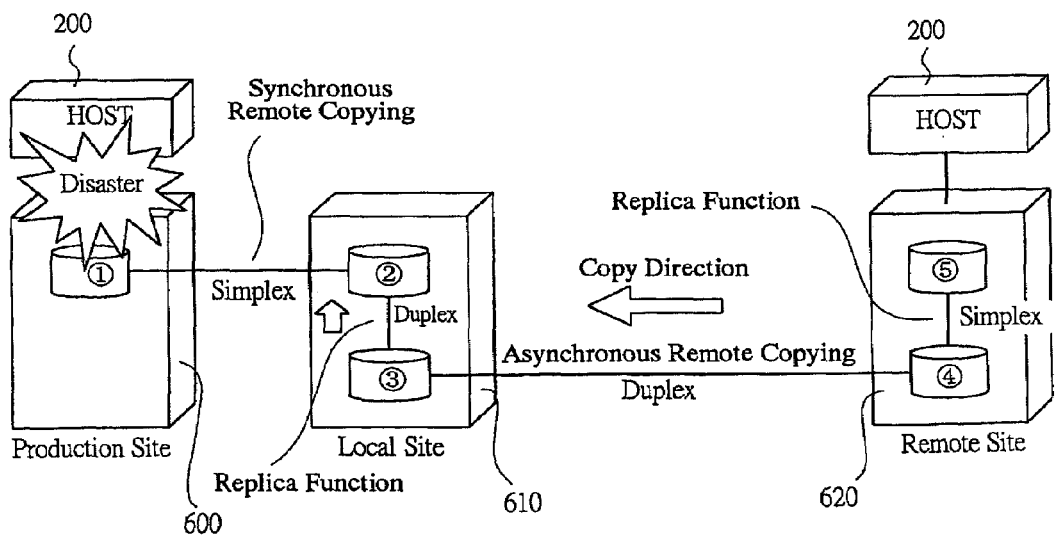
FIG. 13 is a diagram showing a state of each pair at a time of starting an application at a remote site in the embodiment of the present invention.

With reference to FIGS. 9 to 16, an example of a recovering procedure at a time of occurrence of disaster will be described. FIG. 9 is a diagram showing a state of starting failover in a recovering procedure at a time of occurrence of disaster. FIG. 10 is a diagram showing a pair operating process in a state of starting data transfer. FIG. 11 is a diagram showing a recovering procedure when the function of the production site is stopped. FIG. 12 is a diagram showing a state of each pair when data transfer is completed. FIG. 13 is a diagram showing a state of each pair when an application is started at the remote site. FIG. 14 is a diagram showing a preparing procedure for starting an application. FIG. 15 is a diagram showing procedures for patterns 1 to 4. FIG. 16 is a diagram showing a procedure for pattern 5.

The recovering procedure at the occurrence of disaster (a procedure for allocating the latest data to the remote site) is as follows. Note that different recovering procedures are taken depending on a disaster area, more specifically, depending on whether a disaster-affected area is only at the production site or at the production site and the local site.

<Recovering Procedure when Production Site is Affected by Disaster>

The recovering procedure when the function of the production site is stopped by disaster or the like is as follows.

(A) Wait until the state of each pair is stabilized. This is because each pair has not yet been established if each pair is in a Splitting, Suspending, or Resyncing state.

(B) Transfer data of the volume 2 to the volume 4 at the remote site, and then start an application with the volume 4. In this procedure, since a function stop occurs only at the production site, the latest data is present in the volume 2. However, if the function of the local site is stopped during data transfer of the volume 2, the volume 4 becomes inconsistent. Therefore, before the data transfer, the data with consistency is moved to the volume 5. Note that, to transfer the data of the volume 2 to the volume 4, the same procedure as that taken in normal data-transfer cycle is used.

(1) Transfer Preparation

As described above, since the latest data is present in the volume 2, the data-transfer cycle in the course of execution is stopped (in practice, since the function of storage management software at the production site is stopped, the data-transfer cycle is stopped when the state of each pair becomes fixed) and the state of each pair has to be changed to the state of starting the data transfer. That is, the synchronous remote copying of the volumes 1→2 is uncertain (?); the replica function of the volumes 2→3 is in a Duplex state; the asynchronous remote copying of the volumes 3→4 is in a Suspend state; and the replica function of the volumes 4→5 is in a Split state. The pair operating process in the state of starting the data transfer includes, as shown in FIG. 10, a state of starting recovery and in a state of A, C, E, L, N, T, and V.

Note that, in the actual system, a plurality of replica function pairs are collectively treated as a replica function of the volumes 2→3. In this case, since the Split or Resync instruction cannot be simultaneously issued to all the pairs, there occurs a situation in which one portion of the pairs is in a Duplex state and the other portion is in a Split state. Failover with such a situation being left complicates the overall state. Therefore, before the above pair operating process, all pairs are made to be in Duplex states (hereinafter referred to as "all Duplex"). If all the pairs are made to be in Split states, the data of the volume 3 becomes inconsistent. The same problem occurs to the copying of the volumes 3→4 and the replica function of the volumes 4→5 and, therefore, all the pairs are made to be in Duplex states.

(2) Data Transfer to Volume 5

For data transfer to the volume 5, no operation is required since such data transfer has already been performed in the pair operation in the above-mentioned transfer preparation. If the replica function of the volumes 4→5 is in a Split state before the transfer preparation, the volume 5 has already contained therein data with consistency. If the replica function of the volumes 4→5 is in a Duplex state, the volume 4 has already contained therein data with consistency. Therefore, through the pair operation in the above-mentioned transfer preparation, the data is transferred to the volume 5.

(3) Data Transfer

The pair operating procedure from the next recovery starting state is shown in FIG. 11. The recovering procedure at a time of stopping the function of the production site is executed as follows as shown in FIG. 11. That is, from a recovery start state, there are executed a Split instruction of the volumes 2→3 and a Resync instruction of the volumes 3→4.

For example, in the recovery start state, the synchronous remote copying between the volumes 1 and 2 is uncertain (?); the replica function between the volumes 2 and 3 is in a Duplex state; the asynchronous remote copying between the volumes 4 and 5 is in a Suspend state; and the replica function between the volumes 4 and 5 is in a Split state. In the process of issuing a Split instruction of the volumes 2→3, the replica function between the volumes 2 and 3 becomes in a state of: Duplex→Splitting→Split. In the process of issuing a Resync instruction of the volumes 3→4, the asynchronous remote copying between the volumes 3 and 4 becomes in a state of: Suspend→Duplex Pending (Resyncing)→Duplex.

Note that, in the process of issuing a Resync instruction of the volumes 3→4, after all the replica function pairs between the volumes 2 and 3 transit to Split states, a Suspend instruction has to be issued to the asynchronous remote copying between the volumes 3 and 4.

(4) Start Application at Remote Site

At a time of completing data transfer in above item (2), the pair state in each volume is shown in FIG. 12. That is, the synchronous remote copying of the volumes 1→2 is uncertain (?); the replica function of the volumes 2→3 is in a Split state; the asynchronous remote copying of the volumes 3→4 is in a Duplex state; and the replica function of the volumes 4→5 is in a Split state.

Therefore, to start the application using the volume 4, the pair state of the volume 4 has to be released. The state of each pair allowing the application to operate at the remote site is shown in FIG. 13. That is, in copying from the remote site to the local site, the asynchronous remote copying of the volumes 4→3 is in a Duplex state; the replica function of the volumes 3→2 is in a Duplex state; and the synchronous remote copying of the volumes 2→1 is in a Simplex state.

The preparation procedure for starting the application at the remote site will be shown in FIG. 14. In the preparation procedure, from a data-transfer-completed state there are executed: a Delete instruction of the volumes 1→2; a Delete instruction of the volumes 2→3; a Suspend (Reverse mode) instruction of the volumes 3→4; and a Resync (Reverse mode) instruction of the volumes 3→4; and a pair establishing instruction of the volumes 3→2. In the Reverse mode, an operation of reversing a primary volume (P-Vol)/a secondary volume (S-Vol) is performed.

For example, in the data-transfer-completed state, the synchronous remote copying between the volumes 1 and 2 is uncertain (?); the replica function between the volumes 2 and 3 is in a Split state; the asynchronous remote copying between the volumes 3 and 4 is in a Duplex state; and the replica function between the volumes 4 and 5 is in a Split state. In the process of issuing a Delete instruction of the volumes 1→2, the synchronous remote copying between the volumes 1 and 2 becomes in a state of: uncertain (?)→Deleting→Simplex. In the process of issuing a Delete instruction of the volumes 2→3, the replica function between the volumes 2 and 3 is in a state of: Split→Deleting→Simplex. In the process of issuing a Suspend (Reverse mode) instruction of the volumes 3→4, the asynchronous remote copying between the volumes 3 and 4 is in a state of: Duplex→Suspending→Suspend. In the process of issuing a Resync (Reverse mode) instruction of the volumes 3→4, the asynchronous remote copying between the volumes 3 and 4 is in a state of: Suspend→Resyncing→Duplex. In the process of issuing a pair establishing instruction of the volumes 3→2, the replica function between the volumes 2 and 3 is in a state of: Simplex→Duplex Pending→Duplex. Note that, in the process of issuing a Resync (Reverse mode) instruction of the volumes 3→4, the application is in an operable state at the remote site.

<Recovering Procedure when Production Site and Remote Site are Affected by Disaster>

When the production site and the remote site are affected by disaster and their functions are stopped, data of the volume 4 or 5 at the remote site is used. Which data of the volume 4 or 5 is used is determined depending on which data is the latest or which data has ensured consistency. A scheme for this determination will be described below.

For example, in pattern 1, when the asynchronous remote copying between the volumes 3 and 4 is in a Suspend state and the replica function between the volumes 4 and 5 is in a Split state, the data of the volume 4 is used as application-using data because the state of data is such that the data of the volume 4 is identical to that of the volume 5 or the data of the volume 4 is the latest. Similarly, in pattern 2, when the asynchronous remote copying is in a Suspend state and the replica function is in a Resyncing state, the data of the volume 4 is used because the state of data is such that the data of the volume 4 is identical to that of the volume 5 after the state is fixed. In pattern 3, when the asynchronous remote copying is in a Suspend state and the replica function is in a Duplex state, the data of the volume 4 is used because the state of data is such that the data of the volume 4 is identical to that of the volume 5. In pattern 4, when the asynchronous remote copying is in a Suspend state and the replica function is in a Splitting state, the data of the volume 4 is used because the state of data is such that the data of the volume 4 is identical to that of the volume 5 after the state is fixed.

Also, in pattern 5, when the asynchronous remote copying is in a state other than the Suspend (failed Suspend, for example) state and the replica function is in a Split state, the data of the volume 5 is used because the data of the volume 3 is being transferred to the volume 4 in the asynchronous remote copying between the volumes 3 and 4 and the data consistency of the volume 4 is not ensured. In pattern 6, there is assumed a state in which the asynchronous remote copying between the volumes 3 and 4 is in a state other than the Suspend (failed Suspend, for example) state and the replica function between the volumes 4 and 5 is in a state other than the Split (Duplex or Simple, for example) state. Such a state in the pattern 6 does not occur at the normal operations, but can occur when two sites are affected by disaster due to pair failure. In pattern 7, there is assumed a state in which the asynchronous remote copying between the volumes 3 and 4 is in a Suspend state and the replica function between the volumes 4 and 5 is in a failed Suspend state. Such a state in the pattern 7 does not occur at the normal operations, but can occur when two sites are affected by disaster due to pair failure. In the patterns 6 and 7, if failed portions are analyzed in detail, there is a possibility of using either one of the data of the volume 4 and that of the volume 5. However, it is impossible to determine which to use with the pair state, and therefore the procedure gives up determination. The patterns 6 and 7 have no volume capable of being used as the application-using data.

Next, a procedure for staring the application is shown as follows. In the above patterns 1 to 4, the data of the volume 4 is used to start up the application at the remote site. Meanwhile, in the pattern 5, the data of the volume 5 is used. Such determination can be attained by determining states of the asynchronous remote copying between the volumes 3 and 4 and the replica function between the volumes 4 and 5. That is, when the asynchronous remote copying between the volumes 3 and 4 is in a normal Suspend state and the replica function between the volumes 4 and 5 is in a failed Suspend state, the data of the volume 4 is used. When the asynchronous remote copying between the volumes 3 and 4 is in a state other than the normal Suspend state and the replica function between the volumes 4 and 5 is in a normal Suspend, the data of the volume 5 is used.

Thereby, after determining which data of the volume 4 or 5 is used, the following procedure is executed.

In the patterns 1 to 4, as shown in FIG. 15, from a failure occurring state there are executed: a Delete instruction of the volumes 4→5; and a Suspend (Reverse mode) instruction of the volumes 3→4.

For example, in the failure occurring state, the asynchronous remote copying between the volumes 3 and 4 is in a Suspend state; and the replica function between the volumes 4 and 5 is in a Split/Resyncing/Duplex/Splitting state. Then, in the process of issuing a Delete instruction between the volumes 4→5, the replica function between the volumes 4 and 5 is in a state of: Split/Resyncing/Duplex/Splitting→Deleting→Simplex. In the process of issuing a Suspend (Reverse mode) instruction of the volumes 3→4, the asynchronous remote copying between the volumes 3 and 4 is in a state of: Suspend→Suspending→Suspend. Note that, in the process of issuing a Delete instruction of the volumes 4→5, the procedure may wait until a state transition of Resyncing/Splitting is completed. However, to reduce a starting time at the remote site, the replica function pair is made in a Delete state even during the state transition.

In the pattern 5, the data of the volume 5 is used for starting up the application. Therefore, the procedure in this case is as follows. That is, from the failure occurring state, there are executed: a Resync (Reverse mode) instruction of the volumes 4→5; a Delete instruction of the volumes 4→5; and a Suspend instruction of the volumes 3→4.

For example, in the failure occurring state, the asynchronous remote copying between the volumes 3 and 4 is in a Suspend (failed Suspend) state; and the replica function between the volumes 4 and 5 is in a Split state. In the process of issuing a Resync (Reverse mode) instruction of the volumes 4→5, the replica function between the volumes 4 and 5 becomes in a state of: Split→Resyncing→Duplex. In the process of issuing a Delete instruction of the volumes 4→5, the replica function between the volumes 4 and 5 becomes in a state of: Duplex→Deleting→Simplex. In the process of issuing a Suspend (Reverse mode) instruction of the volumes 3→4, the asynchronous remote copying between the volumes 3 and 4 becomes in a state of: Suspend→Suspending→Suspend. Note that, in the process of issuing a Delete instruction of the volumes 4→5, a Delete command is issued after all the replica function pairs of the volumes 4→5 become in Duplex states.

<Recovering Procedure at Disaster Recovery>

Figure 17:
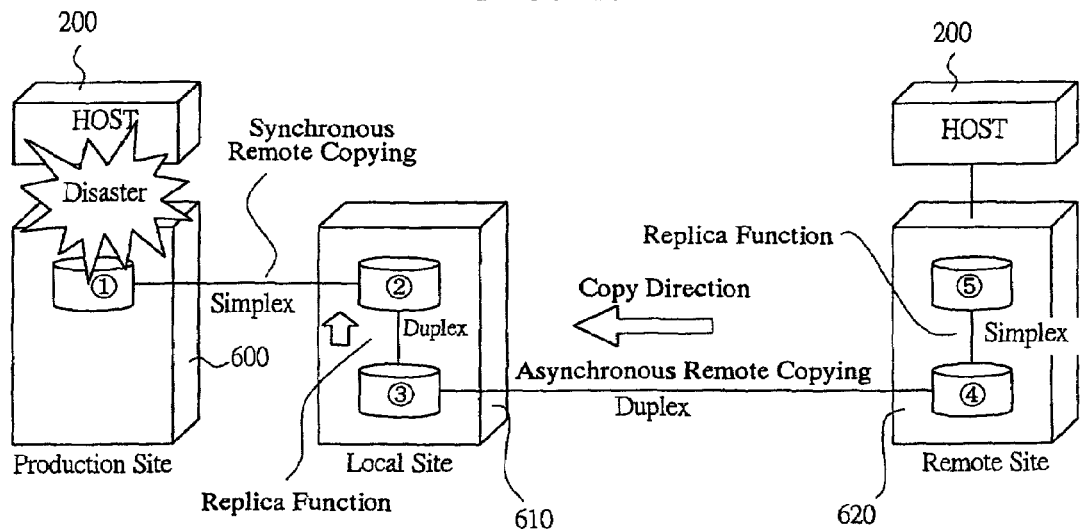
FIG. 17 is a diagram showing a configuration at a time of failover to the remote site when a production site function is stopped in the embodiment of the present invention.
Figure 18:
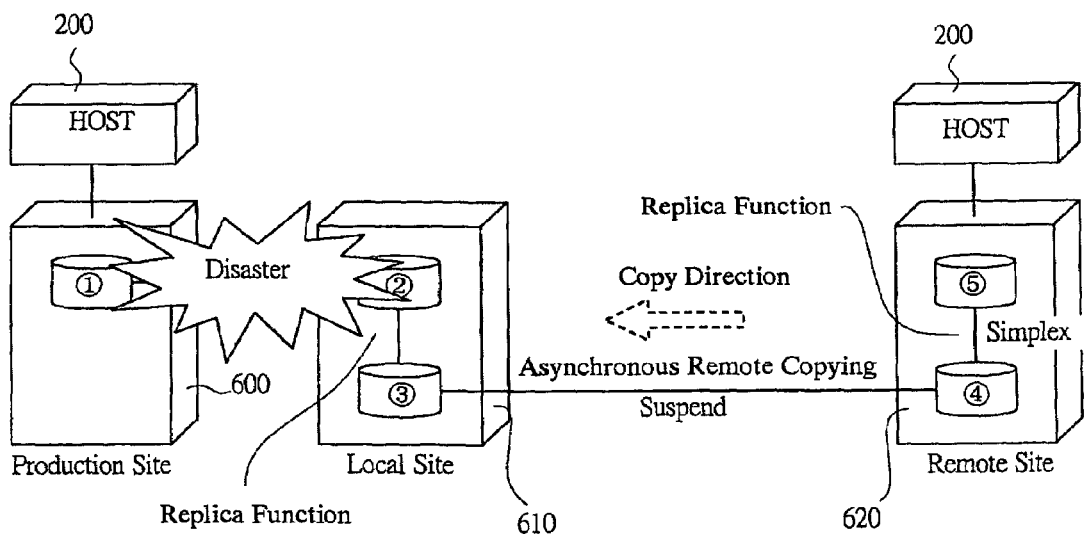
FIG. 18 is a diagram showing a configuration at a time of failover to the remote site when a production site function and a local site function are stopped in the embodiment of the present invention.

With reference to FIGS. 17 to 25, an example of a recovering procedure at a time of disaster recovery will be described. FIG. 17 is a diagram showing a configuration at the time of failover to the remote site when a function of the production site is stopped. FIG. 18 is a diagram showing a configuration at a time of failover to the remote site when the function of the production site and the function of the local site are stopped. FIG. 19 is a diagram showing a local-site recovering procedure (when appliances at the local site cannot be reused). FIG. 20 is a diagram showing another local-site recovering procedure (when appliances at the local site can be reused). FIG. 21 is a diagram showing a production-site recovering procedure. FIGS. 22 and 23 are diagrams showing a production-site testing procedure. FIGS. 24 and 25 are diagrams showing task switching to the production site.

When the production site is affected by disaster as shown in FIG. 17 or when the production site and the local site are affected by the disaster as shown in FIG. 18, the function of the production site or the functions of the production site and the local site are stopped due to affection of the disaster. Therefore, the embodiment in this case has a configuration in which failover is executed at the remote site.

The data recovering procedure to be performed when the production site is recovered from the above disaster state and when the production site and the local site are recovered from the above disaster state will be described below. Note that, when both of the production site and the local site are affected by disaster, the production site may possibly be prioritized for recovery. However, in the present data recovering procedure, data recovery of the "remote site"→"local site" is first performed and then data recovery of the "local site"→"production site" is performed. Thereafter, the data recovering procedure executed when only the production site is affected by disaster becomes a subset of data recovering procedure executed when both of the production site and the local site are affected by disaster. The recovering procedures for the local site and the production site are as follows.

(A) Recovering Appliance at Local Site

This procedure is not required when failover at the time of a function stop of the production site is performed. It is executed by: (1) deleting a replica function pair of the volumes 2→3; (2) resynchronizing an asynchronous remote copy pair of the volumes 4→3 (If the appliances at the local site cannot be reused, the asynchronous remote copy pair of the volumes 3→4 is deleted and the asynchronous remote copy path of the volumes 4→3 is established and the asynchronous remote copy pair of the volumes 4→3 is established, whereas if the appliances at the local site can be reused, Resync (Reverse mode) of the asynchronous remote copy pair of the volumes 4→3 is executed); (3) deleting a synchronous remote copy pair of the volumes 1→2; and (4) establishing a replica function pair of the volumes 3→2.

Note that if a replica function pair of the volumes 2→3 remains, no asynchronous remote copy pair of the volumes 4→3 can be constructed. Therefore, the replica function pair of the volumes 2→3 is first deleted. For this reason, an object for establishing a replica function pair of the volumes 3→2 is all the copying.

(B) Recovering Appliance at Production Site

It is executed by: (1) deleting the synchronous remote copy pair of the volumes 1→2 (if such a state remains at the production site); (2) performing Split of the replica function pair of the volumes 3→2; (3) establishing a synchronous remote copy pair of the volumes 2→1; and (4) performing Suspend of the synchronous remote copy pair of the volumes 2→1.

(C) Application Test at Production Site

It is executed by: (1) performing Write-enable Suspend of the synchronous remote copy pair of the volumes 2→1; (2) starting up and testing the application at the production site; (3) performing Resync of the replica function pair of the volumes 3→2; (4) performing Split of the replica function pair of the volumes 3→2; (5) performing Resync of the synchronous remote copy pair of the volumes 2→1; (6) performing Suspend of the synchronous remote copy pair of the volumes 2→1; and (7) performing Resync of the replica function pair of the volumes 3→2.

Note that, if the test in item (2) fails, Resync of the synchronous remote copy pair of the volumes 2→1 may be performed and then again Write-enable Suspend may be tested.

(D) Application Stop at Remote Site

It is executed by: (1) stopping the application at the remote site; (2) performing Split of & deleting the asynchronous remote copy pair of the volumes 4→3; (3) performing Split of & deleting the replica function pair of the volumes 3→2; (4) performing Resync of the synchronous remote copy pair of the volumes 2→1; (5) performing Split of & deleting the synchronous remote copy pair of the volumes 2→1; and (6) establishing a synchronous remote copy pair of the volumes 1→2. Note that, the procedure so far is controlled by storage-management software at the remote site.

(E) Application Switching to Production Site

It is executed by: (1) starting up the application at the production site; and (2) recovering the state of each pair through the initial copy establishing procedure. In item (2), the volumes 1→2 may be in a Duplex state and the volumes 4→5 may be in a Split state. In the case of establishing the pair, the problem arises because formation of the pair that has already been in a Duplex state is omitted and formation of the pair in a Suspend or Split state is replaced by a Resync state. Note that the procedure so far is control by storage-management software at the production site.

Hereinafter, pair-operating procedures for the production site, the local site, the data recovery at the time of disaster recovery will be described.

In a local-site recovering procedure (when the appliance at the local site cannot be reused), the following processes as shown in FIG. 19 is executed by: from a state of failover to the remote site, a Delete instruction of the volumes 3→4; a pair establishing instruction of the volumes 4→3; a pair Delete instruction between the volumes 1→2; and a pair establishing instruction of the volumes 3→2.

For example, in the state of failover to the remote site, the synchronous remote copying between the volumes 1 and 2 is uncertain; the replica function between the volumes 2 and 3 is in a Simplex state; the asynchronous remote copying between the volumes 3 and 4 is in a Suspend (Reverse mode) state; and the replica function between the volumes 4 and 5 is in a Simplex/Split state. In the process of issuing a Delete instruction of the volumes 3→4, the asynchronous remote copying between the volumes 3 and 4 becomes in a state of: Suspend (Reverse mode)→Deleting→Simplex. In the process of issuing a pair establishing instruction of the volumes 4→3, the asynchronous remote copying between the volumes 3 and 4 becomes in a state of: Simplex→Duplex Pending→Duplex. In the process of issuing a pair Delete instruction of the volumes 1→2, the synchronous remote copying between the volumes 1 and 2 becomes in a state of: uncertain→Deleting→Simplex. In the process of issuing a pair establishing instruction of the volumes 3→2, the replica function between the volumes 2 and 3 becomes in a state of: Simplex→Duplex Pending→Duplex.

In a local-site recovering procedure (when the appliance at the local site can be reused), the following processes are executed as shown in FIG. 20 by: from a state of failover to the remote site, a Delete instruction of the volumes 2→3; a Resync (Reverse mode) instruction of the volumes 3→4; a pair Delete instruction between the volumes 1→2; and a pair establishing instruction of the volumes 3→2.

In a production-site recovering procedure, the following processes are executed as shown in FIG. 21 by: from a state after the recovery of the local site, a pair Delete instruction of the volumes 1→2; a pair time-designation Suspend instruction of the volumes 4→3; a pair Split instruction of the volumes 3→2; a pair Resync instruction of the volumes 4→3; a pair establishing instruction of the volumes 2→1; and a pair Suspend instruction of the volumes 2→1.

Note that the pair Delete instruction between the volumes 1→2 is performed when the state of a synchronous remote copy pair at the production site remains. Also, from the pair time-designation Suspend instruction of the volumes 4→3 to the pair Resync instruction of the volumes 4→3, in order to ensure data consistency in the volume 2, the time-designation Suspend instruction is used.

In a production-site test procedure, the following processes are executed as shown in FIGS. 22 and 23 by: a pair secondary volume Write-enable instruction of the volumes 2→1; performing of a production-site test; a pair Resync instruction of the volumes 3→2; a pair time-designation Suspend instruction of the volumes 4→3; a pair Split instruction of the volumes 3→2; a pair Resync instruction of the volumes 4→3; a pair Resync instruction of the volumes 2→1; a pair Suspend instruction of the volumes 2→1; and a pair Resync instruction of the volumes 3→2.

Note that, in the execution of the production-site test, if the test fails, the synchronous remote copy pair of the volumes 1→2 is in a Resync state and thereafter the process for the Write-enable Suspend may be performed again for testing. Also, from a pair time-designation Suspend instruction of the volumes 4→3 to a pair Resync instruction of the volumes 4→3, in order to ensure consistency in the volume 2, the time-designation Suspend instruction is used.

In task switching to the production site, the following processes are executed as shown in FIGS. 24 and 25 by: stopping the application at the remote site; a pair Suspend & Delete instruction of the volumes 4→3; a pair Split & Delete instruction of the volumes 3→2; a pair Resync instruction of the volumes 2→1; a pair Split & Resync instruction of the volumes 2→1; a pair Split & Delete instruction of the volumes 2→1; a pair establishing instruction of the volumes 2→1; starting up the application at the production site; and performing the initial pair establishing procedure.

<Data-Consistency Ensuring Function>

Figure 26:
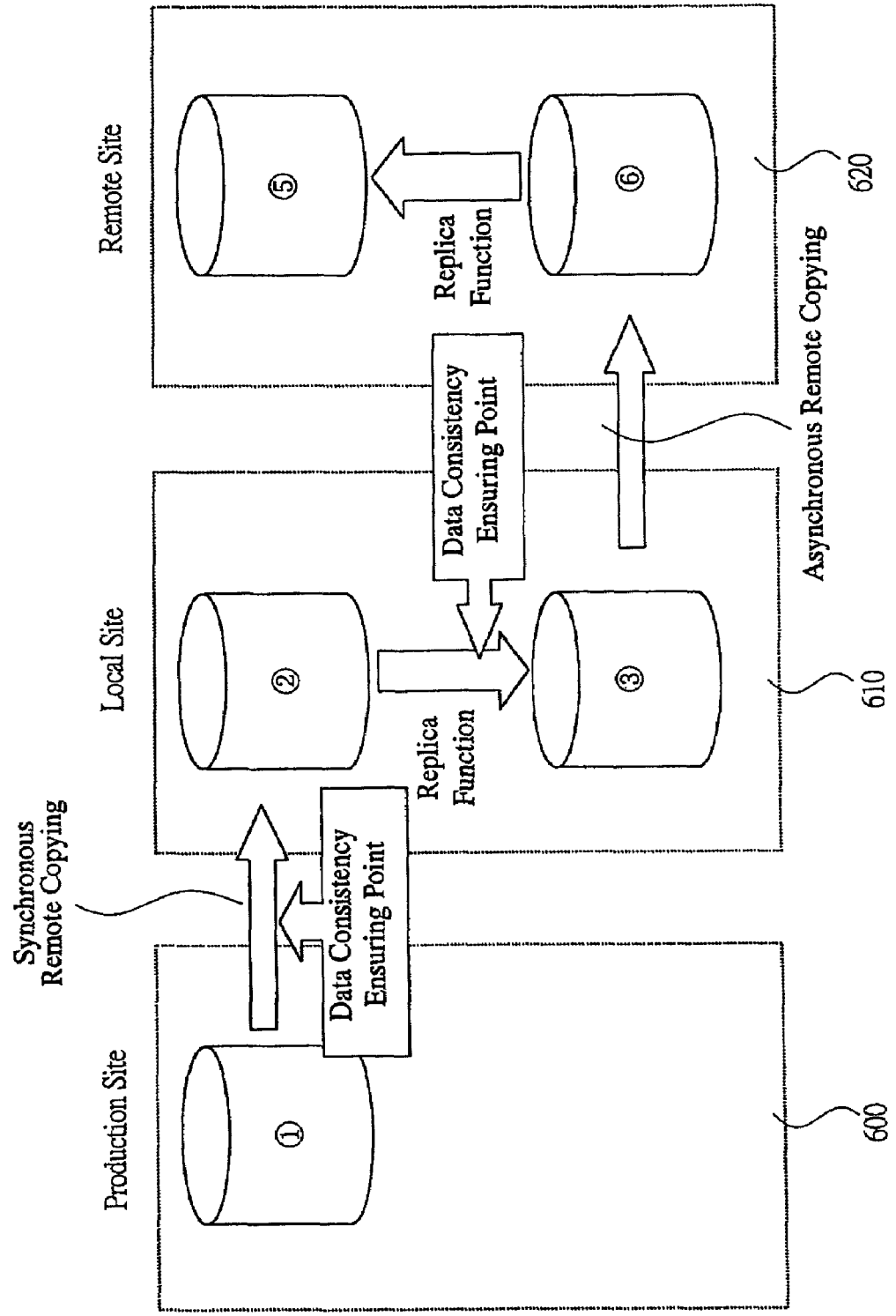
FIG. 26 is a diagram showing a guarantee configuration of data consistency in the embodiment of the present invention.
Figure 27:
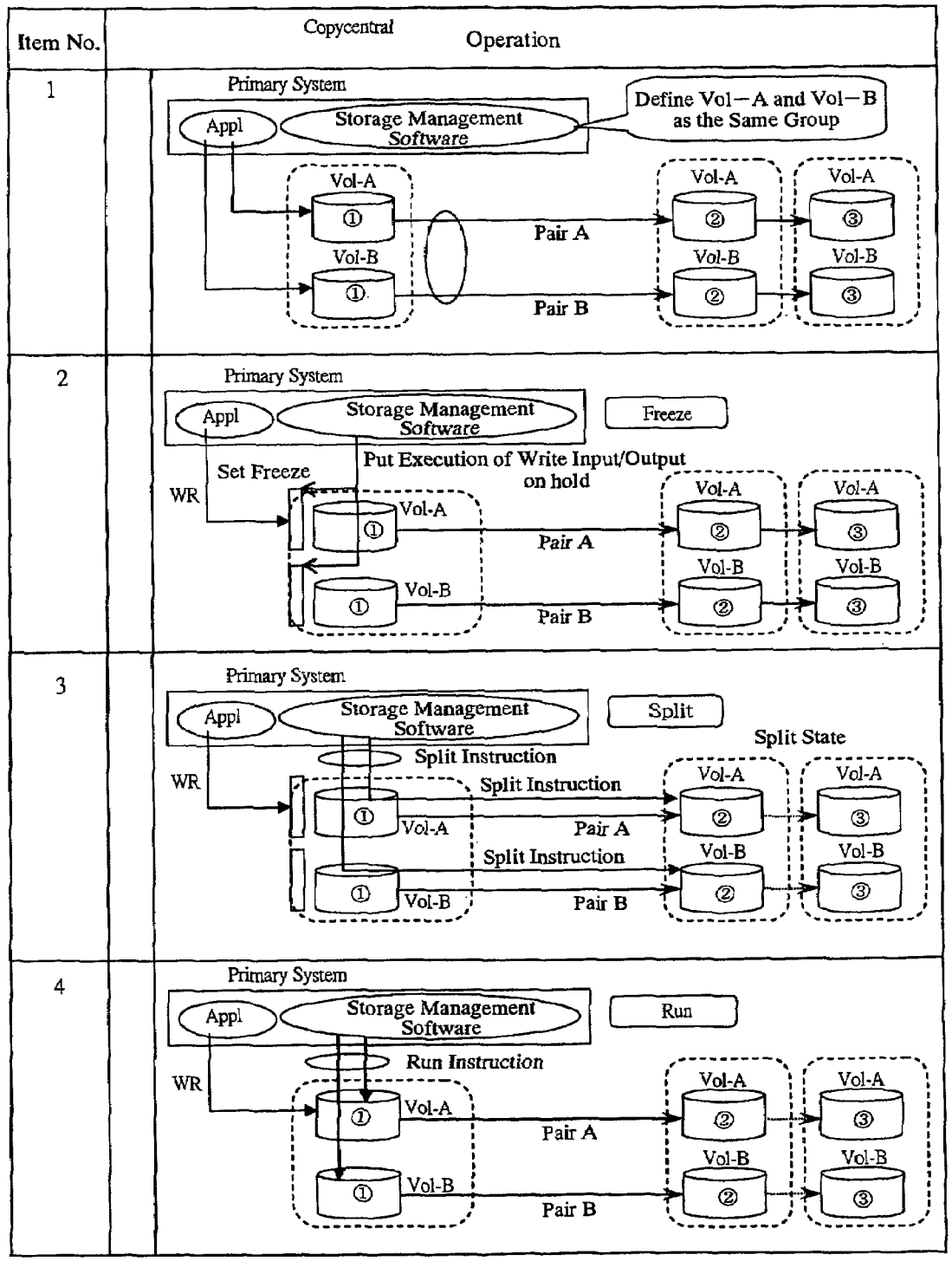
FIG. 27 is a diagram showing a Split operation of a replica function pair between volumes 2 and 3 in a Freeze/Run scheme in the embodiment of the present invention.

With reference to FIGS. 26 and 27, an example of a data-consistency ensuring function will be described. FIG. 26 is a diagram showing a configuration for ensuring data consistency. FIG. 27 is a diagram showing a Split operation of a replica function pair between the volumes 2 and 3 in a Freeze/Run scheme.

Also in 3DC Cascading remote copying, in order to allow a recovering operation (failover) at a time of failure (disaster) at the remote site, the data consistency between the volumes has to be ensured.

In the 3DC Cascading remote copying, a point of ensuring data consistency is, as shown in FIG. 26, between the synchronous remote copy pairs of the volumes 1 and 2 or between the replica function pairs of the volumes 2 and 3. However, if Suspend of the synchronous remote copy pair is performed, no data loss is unsatisfactory at a time when the production site is affected by disaster. This is because if Suspend is performed on the synchronous remote copying between the volumes 1 and 2, the latest data is present only at the volume 1 and if the production site is affected by disaster, the latest data is lost. Therefore, in the 3DC Cascading remote copying, data consistency is ensured at the time of performing Split of the replica function between the volumes 2 and 3.

In the scheme of ensuring data consistency at the time of performing Split of the replica function pairs of the volumes 2 and 3, data consistency can be ensured between the volumes in the disk array device by the above-described function of collective Split of the replica function pairs. However, data consistency between the volumes over the disk array devices cannot be ensured. Therefore, as a scheme of ensuring the data consistency of the volumes over the disk array devices, a Freeze/Run scheme is adopted. In the Freeze/Run scheme, the Write operation to the volume 1, which corresponds to a replica function pair which is subjected to the replica function pair operation, is temporarily stopped (Freezed) and, during the Freeze, the replica function pair between the volumes 2 and 3 is performed by the Split.

A specific procedure is shown in FIG. 27. Note that, in FIG. 27, a "Primary System" corresponds to the disk array device 600 at the production site and the host 200 connected thereto. Also, this Primary System includes an application program (Appl) and storage management software having a copy processing function etc.

(1) At the time of establishing a synchronous remote copy pair, it is defined that a pair "A" and a pair "B" are under the same group. A volume "A" (Vol-A) of the pair "A" and a volume "B" (Vol-B) of the pair "B" may be under different disk array devices.

(2) A Freeze command is issued to all the disk array devices, in which a synchronous remote copy pair configuring a synchronous remote copy group to be a Suspend object is present. Each disk array device receiving this Freeze command puts the execution of a write input/output of the synchronous remote copy pair set as a group on hold. Note that the write input/output being executed at the time of receiving the Freeze command is not put on hold.

(3) A Split instruction is issued to the replica function pair between the volumes 2 and 3, which forms the group. More specifically, the Split instruction is issued to an arbitrary replica function pair which serves as a representative of each disk array device. Thereby, the disk array device performs a process of collective Split of the replica function pairs in the group under the disk array device.

(4) To release the Freeze state, a Run command is issued to all the disk array devices which have issued the Freeze command.

Note that, when a Write command is received while the execution of the write input/output in the disk array device is put on hold, it is checked whether the Freeze state has been set. If the Freeze state has been set, the process of Sleep is performed for a predetermined time (several tens of microseconds) and then again a Freeze flag is checked. If the Freeze state has not been released within the predetermined time, the Freeze state is forcefully released. This check is made for the purpose of reporting, to the host, on the host information indicating that a command for release of the Freeze state (Run) has not been issued within the predetermined time and of performing retry from the host.

<Remote Command Function>

Figure 28:
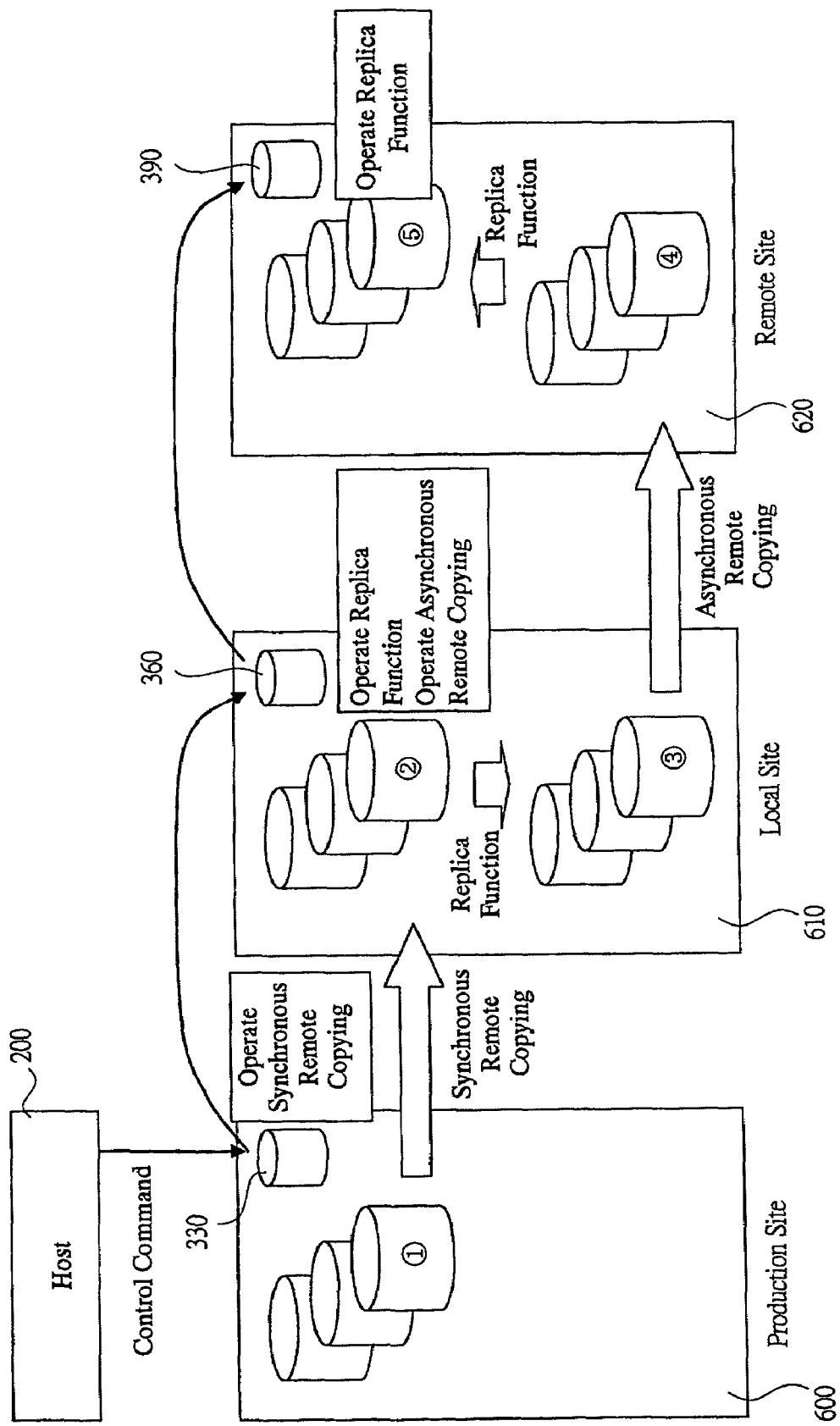
FIG. 28 is a diagram showing a command device in the embodiment of the present invention.
Figure 29:
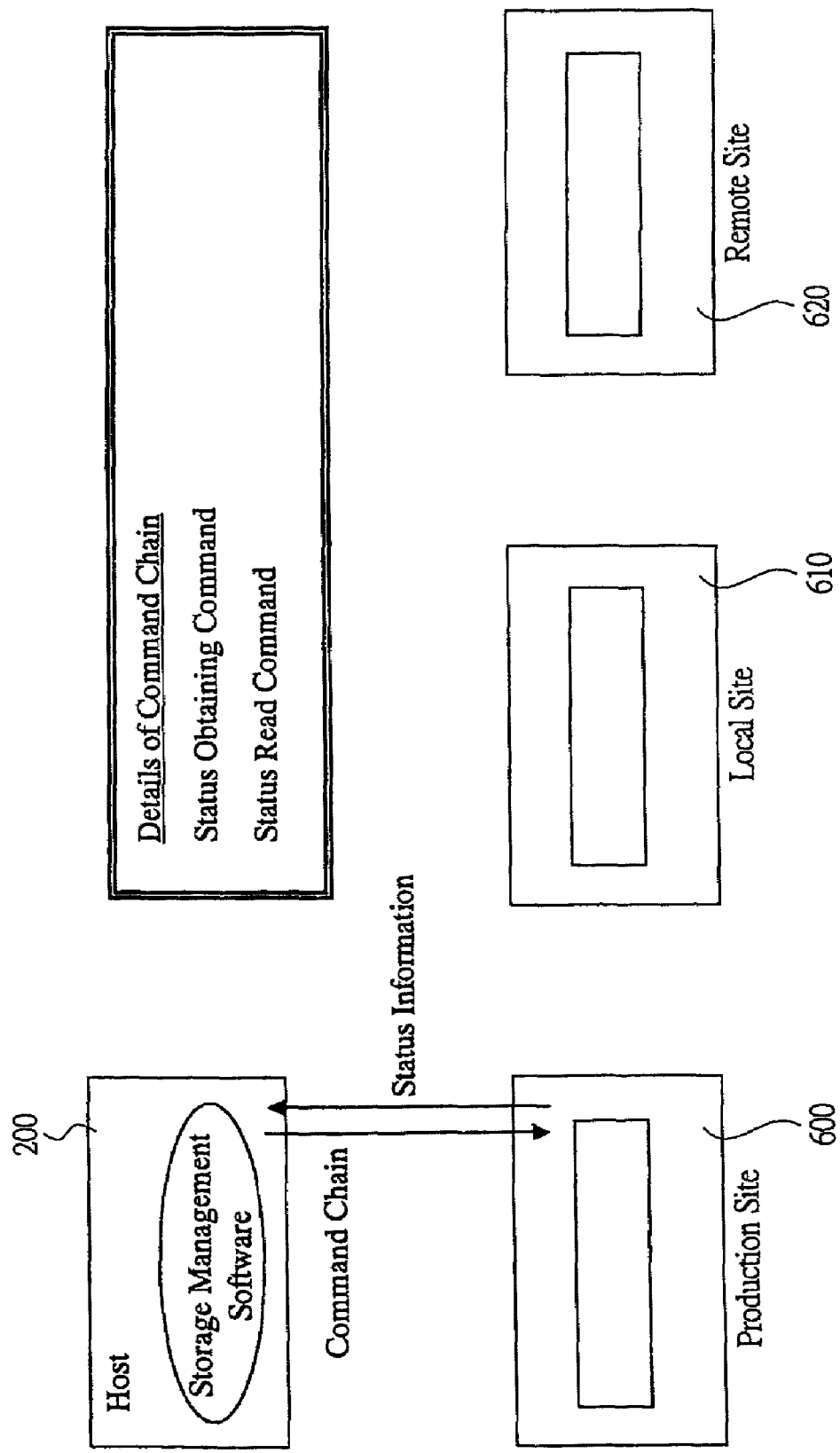
FIG. 29 is a diagram showing execution of the production site in a command chain in the embodiment of the present invention.
Figure 30:
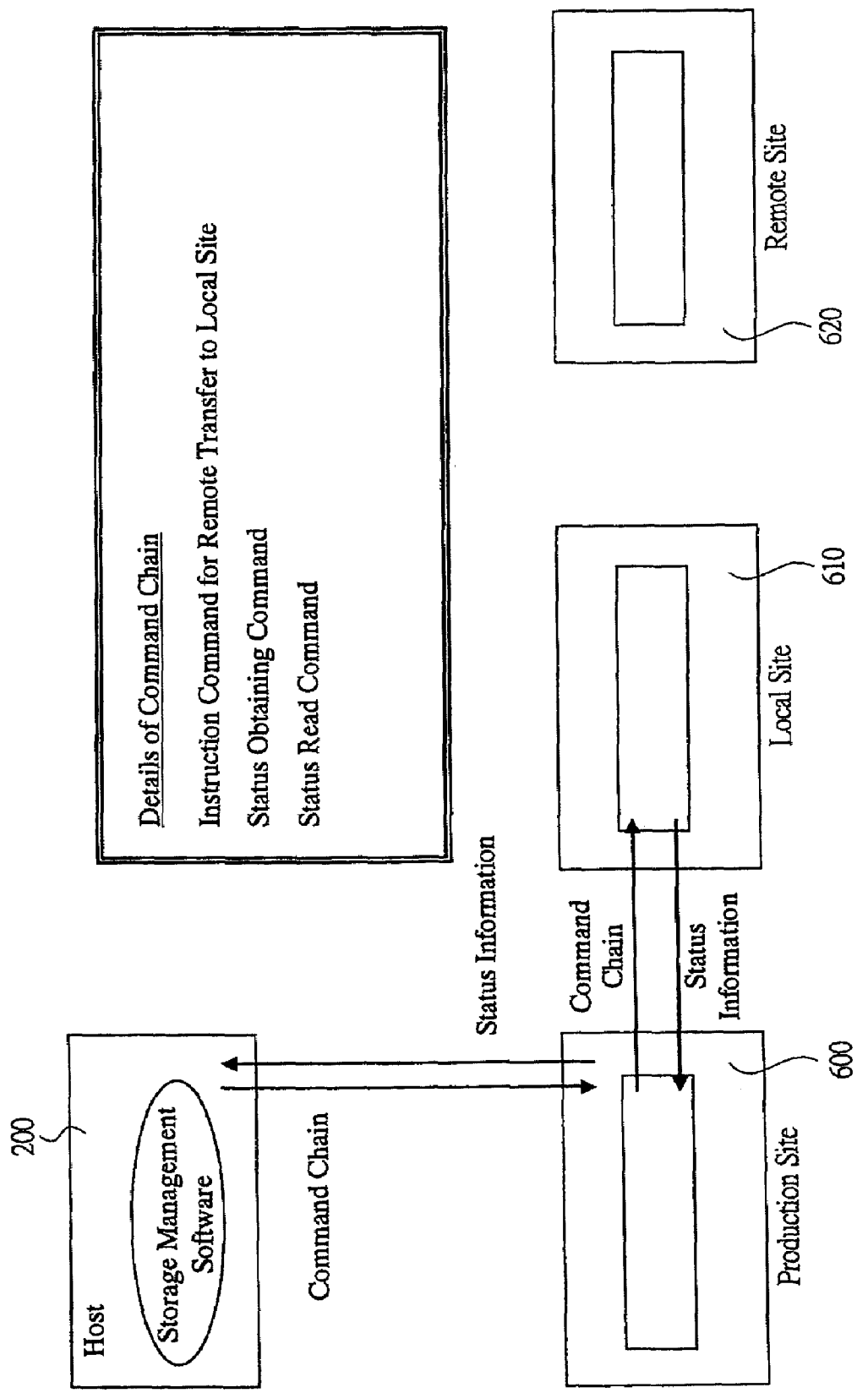
FIG. 30 is a diagram showing execution of the local site in the command chain in the embodiment of the present invention.

With reference to FIGS. 28 to 31, an example of the remote command function will be described. FIG. 28 is a diagram showing a command device. FIG. 29 is a diagram showing execution of the production site in a command chain. FIG. 30 is a diagram showing execution of the local site. FIG. 31 is a diagram showing the remote site.

In the 3DC Cascading, in cooperation with the storage management software, not only a synchronous remote copy pair operation to the disk array device at the production site but also an asynchronous remote copy pair operation and the replica function pair operation to the disk array device 610 at the local site and the replica function pair operation to the disk array device 620 at the remote site are all performed from the host (storage management software) 200 of the production site. At this time, the disk array device 600 at the production site transfers a pair operation command received from the host 200 of the production site to the disk array device 610 at the local site, and then the disk array device 610 at the local site transfers the command to the disk array device 620 at the remote site. Then, the command is executed at the relevant site.

As command devices, volumes 330, 360, and 390 are allocated in the sites as shown in FIG. 28 for issuing an operation command for controlling a synchronous remote copy pair, an asynchronous remote copy pair, or a replica function pair from the production site to the local site and the remote site.

In a command chain scheme, examples of command issuance to each site are shown in FIGS. 29 to 31. When an instruction for remote execution is issued to a site other than the production site, order of being guided to that site has to be designated.

In executing the production site, as shown in FIG. 29, for example, a status obtaining command and a status read command are issued as a command chain from the host 200. Upon receiving it, the disk array device 600 at the production site makes a response of status information to the host 200.

In executing the local site, as shown in FIG. 30, for example, an instruction command for remote transfer to the local site, a status obtaining command, and a status read command are issued as a command chain from the host 200. Upon receiving it via the production site, the disk array device 610 at the local site makes a response of status information to the host 200 via the production site.

In executing the remote site, as shown in FIG. 31, for example, an instruction command for remote transfer to the local site, an instruction command for remote transfer to the remote site, a status obtaining command, and a status read command are issued as a command chain from the host 200. Upon receiving it via the production site and the local site, the disk array device 620 at the remote site makes a response of status information to the host 200 via the local site and the production site.

<Command Specification>

A 3DC Cascading function is achieved in cooperation with the storage management software.

Of a synchronous remote copy/replica function control command and information obtaining instruction command, the synchronous remote copy/replica function control command provides a means of achieving control over a synchronous remote copy/replica function pair and obtaining status information from the host 200.

For example, pair control commands include a command of defining a synchronous remote copy/replica function pair, a command of suspending a synchronous remote copy/replica function pair, a command of resynchronizing a synchronous remote copy/replica function pair, and a command of releasing a synchronous remote copy/replica function pair.

<Effects of Present Embodiment>

(1) As in the 3DC Cascading structure, in the data processing system having the plurality of the disk array devices 600, 610, and 620, data transfer is performed in combination with: the remote copying including the synchronous remote copying between the disk array device 600 at the production site and the disk array device 610 at the local site; the asynchronous remote copying between the disk array device 610 at the local site and the disk array device 620 at the remote site; and the replica function in each of the disk array devices 610 and 620. At the time of occurrence of disaster, for example, when only the production site is affected by disaster or when the production site and the remote site are affected by disaster, it is possible to simultaneously achieve long-distance communication and no data loss.

(2) From the host 200 connected to the disk array device 600 at the production site, by issuing a command having a remote command function, it is possible to collectively control the synchronous remote copying between the disk array device 600 at the production site and the disk array device 610 at the local site, the asynchronous remote copying between the disk array device 610 at the local site and the disk array device 620 at the remote site, and the replica function in each of the disk array devices 610 and 620.

As mentioned above, the invention made by the present inventors has been specifically described based on the embodiment. However, needless to say, the present invention is not limited to the above embodiment and can be variously altered and modified without departing from the gist thereof.

For example, in the present embodiment, the 3DC Cascading structure has been described by way of example. The present invention can also be applied to 4DC, and 5DC etc.

Also, the present invention is not restricted to be applied to the main-frame system and can also be applied to an open system. In this case, even if the host is connected to the local site, it is possible to prevent the local site from being overloaded. Furthermore, if the volumes are in a group configuration, a suspending process cannot be performed with time designation, and therefore Freeze occurs. The reason for this is that, in the open system, time synchronization cannot be achieved.

What we claim is:

1. A data processing system comprising:
a plurality of disk array devices each including a storage device in which a plurality of logical volumes for storing data are set and a controlling unit for controlling storage of data into the logical volumes set in said storage device,
wherein said plurality of disk array devices include at least a first disk array device and a second disk array device, said first disk array device being disposed at a first site, and said second disk array device being disposed at a second site, wherein said first disk array device includes a first logical volume, and said second disk array device includes a second logical volume and a third logical volume,
wherein said data processing system is capable of bidirectional data transfer between said first disk array device and said second disk array device, wherein a controlling unit of said first disk array device includes a function of, upon reception of a command having a remote command function issued from a host apparatus connected to said first disk array device, analyzing the command, transferring the command to said second disk array device when an instruction command for remote transfer to said second disk array device is added, and performing a process within said first disk array device when it is not added,
wherein the command having said remote command function includes a first control command to said first disk array device for synchronous remote copying from the first logical volume to the second logical volume, and a second control command to said second disk array device for a replica function from the second logical volume to the third logical volume,
wherein, in order to ensure consistency between the first and second logical volumes and between the second and third logical volumes, a write operation to the first logical volume, which corresponds to a replica function pair which is subjected to a replica function pair operation, is temporarily stopped based on receipt of a command to said first disk array device for putting execution of a write I/O to the first logical volume on hold, and while the write operation is stopped, the replica function between the second and third logical volumes is performed by a split operation in response to a split instruction, and
wherein, in response to a command for releasing the hold on the execution of the write I/O to the first logical volume, the write I/O operation to the first logical volume resumes,
wherein the first disk array includes a pair of the first logical volumes, wherein the pair of first logical volumes is set so that the first logical volumes belong to a same group for maintaining consistency, and
wherein the second disk array includes a pair of the second logical volumes and a pair of the third logical volumes.

2. The data processing system according to claim 1, wherein the plurality of disk array devices includes a third disk array device disposed at a third site, said third disk array device including a fourth logical volume and a fifth logical volume.

3. The data processing system according to claim 1, wherein the pair of first logical volumes are set to belong to the same group at the time of establishing the pair of first logical volumes.

4. The data processing system according to claim 1, wherein the controlling unit of the first disk array device includes a first command device which includes a volume for receiving the first control command and wherein the controlling unit of the second disk array device includes a second command device including a volume for receiving the second control command, wherein the second control command is received by the second command device via the first command device.

5. A disk array device comprising a first disk array device in a data processing system which includes a plurality of disk array devices each including a storage device in which a plurality of logical volumes for storing data are set and a controlling unit for controlling storage of data into the logical volumes set in said storage device,
wherein said first disk array device is disposed at a first site, and wherein the plurality of disk array devices includes a second disk array device disposed at a second site, wherein said first disk array device includes a first logical volume, and said second disk array device includes a second logical volume and a third logical volume,
wherein said data processing system is capable of bidirectional data transfer between said first disk array device and said second disk array device, wherein a controlling unit of said first disk array device includes a function of, upon reception of a command having a remote command function issued from a host apparatus connected to said first disk array device, analyzing the command, transferring the command to said second disk array device when an instruction command for remote transfer to said second disk array device is added, and performing a process within said first disk array device when it is not added,
wherein the command having said remote command function includes a first control command to said first disk array device for synchronous remote copying from the first logical volume to the second logical volume, and a second control command to said second disk array device for a replica function from the second logical volume to the third logical volume,
wherein, in order to ensure consistency between the first and second logical volumes and between the second and third logical volumes, a write operation to the first logical volume, which corresponds to a replica function pair which is subjected to a replica function pair operation, is temporarily stopped based on receipt of a command to said first disk array device for putting execution of a write I/O to the first logical volume on hold, and while the write operation is stopped, the replica function between the second and third logical volumes is performed by a split operation in response to a split instruction, and
wherein, in response to a command for releasing the hold on the execution of the write I/O to the first logical volume, the write I/O operation to the first logical volume resumes,
wherein the first disk array includes a pair of the first logical volumes, wherein the pair of first logical volumes is set so that the first logical volumes belong to a same group for maintaining consistency, and
wherein the second disk array includes a pair of the second logical volumes and a pair of the third logical volumes.

6. The data processing system according to claim 5, wherein the plurality of disk array devices includes a third disk array device disposed at a third site, said third disk array device including a fourth logical volume and a fifth logical volume.

7. The disk array device according to claim 5, wherein the pair of first logical volumes are set to belong to the same group at the time of establishing the pair of first logical volumes.

8. The disk array device according to claim 5, wherein the controlling unit of the first disk array device includes a first command device which includes a volume for receiving the first control command and wherein the controlling unit of the second disk array device includes a second command device including a volume for receiving the second control command, wherein the second control command is received by the second command device via the first command device.

9. A data processing system comprising:
a plurality of disk array devices each including a storage device in which a plurality of logical volumes for storing data are set and a controlling unit for controlling storage of data into the logical volumes set in said storage device,
wherein said plurality of disk array devices include at least a first disk array device, a second disk array device, a third disk array device and a fourth disk array device, said first and second disk array devices being disposed at a first site, and said third and fourth disk array devices being disposed at a second site, wherein said first disk array device includes a first logical volume, said second disk array device includes a second logical volume, said third disk array device includes a third logical volume and a fourth logical volume and said fourth disk array device includes a fifth logical volume and a sixth logical volume,
wherein said data processing system is capable of bidirectional data transfer between said first and second disk array devices and said third and fourth disk array devices, wherein controlling units of said first and second disk array devices include a function of, upon reception of a command having a remote command function issued from a host apparatus connected to said first and second disk array devices, analyzing the command, transferring the command to said third and fourth disk array devices when an instruction command for remote transfer to said third and fourth disk array devices is added, and performing a process within said first and second disk array devices when it is not added,
wherein the command having said remote command function includes a first control command to said first and second disk array devices for synchronous remote copying from the first logical volume to the third logical volume and from the second logical volume to the fifth logical volume, and a second control command to said third and fourth disk array devices for a replica function from the third logical volume to the fourth logical volume and for the fifth logical volume to the sixth logical volume,
wherein, in order to ensure consistency between the first and third logical volumes, between the second and fifth logical volumes, between the third and fourth logical volumes, and between the fifth and sixth logical volumes, a write operation to the first and second logical volumes, which corresponds to a replica function pair which is subjected to a replica function pair operation, is temporarily stopped based on receipt of a command to said first and second disk array devices for putting execution of a write I/O to the first and second logical volumes on hold, and while the write operation is stopped, the replica function between the third and fourth logical volumes and between the fifth and sixth logical volumes is performed by a split operation in response to a split instruction,
wherein, in response to a command for releasing the hold on the execution of the write I/O to the first and second logical volumes, the write I/O operation to the first and second logical volumes resumes,
wherein the first and second logical volume comprise a pair of logical volumes and are set to belong to a same group for maintaining consistency.

10. The data processing system according to claim 9, wherein the plurality of disk array devices includes a fifth disk array device and a sixth disk array device, both disposed at a third site, wherein said fifth disk array device includes a seventh logical volume and an eighth logical volume and wherein the sixth disk array device includes a ninth logical volume and a tenth logical volume.

11. The data processing system according to claim 9, wherein the first and second logical volumes are set to belong to the same group at the time of establishing the first and second logical volumes as a pair of logical volumes.

12. The data processing system according to claim 9, wherein the controlling unit of the first disk array device includes a first command device which includes a volume for receiving the first control command, wherein the controlling unit of the second disk array device includes a second command device including a volume for receiving the first control command, wherein the controlling unit of the third disk array device includes a third command device which includes a volume for receiving the second control command and wherein the controlling unit for the fourth disk array device includes a fourth command device which includes a volume for receiving the second control command, and wherein the third command device receives the second control command via the first command device and wherein the fourth command device receives the second control command via the second command device.

* * * * *